(12) United States Patent
Noborikawa et al.

(10) Patent No.: US 12,140,201 B2
(45) Date of Patent: Nov. 12, 2024

(54) HELICAL TOOTH BELT AND BELT TRANSMISSION

(71) Applicant: Mitsuboshi Belting Ltd., Kobe (JP)

(72) Inventors: Yoshihito Noborikawa, Hyogo (JP); Masakuni Yoshida, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 866 days.

(21) Appl. No.: 17/043,120

(22) PCT Filed: Mar. 27, 2019

(86) PCT No.: PCT/JP2019/013477
§ 371 (c)(1),
(2) Date: Sep. 29, 2020

(87) PCT Pub. No.: WO2019/194057
PCT Pub. Date: Oct. 10, 2019

(65) Prior Publication Data
US 2021/0018063 A1    Jan. 21, 2021

(30) Foreign Application Priority Data

Apr. 6, 2018   (JP) ................................ 2018-073961
Mar. 26, 2019  (JP) ................................ 2019-057682

(51) Int. Cl.
*F16G 1/28*   (2006.01)
*D03D 1/00*   (2006.01)
(Continued)

(52) U.S. Cl.
CPC ............ *F16G 1/28* (2013.01); *D03D 1/0094* (2013.01); *D03D 15/283* (2021.01); *F16G 1/04* (2013.01);
(Continued)

(58) Field of Classification Search
CPC ... F16G 1/02; F16G 1/08; F16G 7/023; F16G 1/04; F16G 1/00; F16G 1/06; F16G 1/10;
(Continued)

(56) References Cited

U.S. PATENT DOCUMENTS 8,932,165 B2 *   1/2015   Knox ....................... F16G 1/28
                                                    474/204
9,103,406 B2 *   8/2015   Salmon ................... F16G 5/08
(Continued)

FOREIGN PATENT DOCUMENTS

CN          1535363 A     10/2004
CN        201836294 U      5/2011
(Continued)

OTHER PUBLICATIONS

WO 2014024377 A1 Translated copy from Google Patents (Year: 2014).*
(Continued)

*Primary Examiner* — Michael R Mansen
*Assistant Examiner* — Raveen J Dias
(74) *Attorney, Agent, or Firm* — Banner & Witcoff, Ltd.

(57) ABSTRACT

The present invention relates to a helical toothed belt including: a back portion; a tension member buried in the back portion; and a plurality of tooth portions arranged at a predetermined interval along a belt longitudinal direction on one surface of the back portion, in which the plurality of tooth portions have a tooth pitch of 1.5 mm or more and less than 2.0 mm, the back portion has a thickness of 0.4 mm or more and 1.2 mm or less, the tension member is formed of a twisted cord containing a high-strength glass fiber or a carbon fiber, and the ratio of the total value of an interval between the tension members adjacent to each other to the belt width is 20% or more and 60% or less.

14 Claims, 6 Drawing Sheets

(51) Int. Cl.
*D03D 15/283* (2021.01)
*F16G 1/04* (2006.01)
*F16G 1/08* (2006.01)
*F16G 1/10* (2006.01)
*F16H 7/02* (2006.01)

(52) U.S. Cl.
CPC ............... *F16G 1/08* (2013.01); *F16G 1/10* (2013.01); *F16H 7/023* (2013.01); *D10B 2331/021* (2013.01)

(58) Field of Classification Search
CPC ..... F16G 1/28; F16G 5/00; F16G 5/04; F16G 5/06; F16G 5/08; F16G 5/20; D03D 15/283; D03D 15/573; D03D 15/217; D03D 15/00; D03D 1/0094; D03D 5/0412; D03D 5/0403; B62D 5/403; B62D 1/0094; F16H 7/023; B29D 29/08; D10B 2331/021
USPC ........................................................ 474/148
See application file for complete search history.

(56) References Cited

U.S. PATENT DOCUMENTS

| | | | | |
|---|---|---|---|---|
| 9,341,233 | B2 * | 5/2016 | Mori | D03D 3/02 |
| 10,024,389 | B2 * | 7/2018 | Kim | B29D 29/08 |
| 10,138,981 | B2 * | 11/2018 | Mitsutomi | D03D 1/0094 |
| 2002/0165058 | A1 | 11/2002 | Swope | |
| 2004/0038764 | A1 | 2/2004 | Swope | |
| 2007/0066431 | A1 | 3/2007 | Hironaka | |
| 2007/0137766 | A1 * | 6/2007 | Matsuda | F16G 1/28 156/137 |
| 2008/0318719 | A1 | 12/2008 | Izu et al. | |
| 2010/0120566 | A1 | 5/2010 | Izu et al. | |
| 2011/0160014 | A1 | 6/2011 | Kawahara | |
| 2014/0273697 | A1 * | 9/2014 | Russell | B64D 25/06 139/11 |
| 2015/0152941 | A1 * | 6/2015 | Sekiguchi | B62D 5/04 474/205 |
| 2015/0225012 | A1 * | 8/2015 | Yamaguchi | B62D 5/0424 180/444 |
| 2017/0030431 | A1 * | 2/2017 | Duke, Jr. | F16G 1/04 |
| 2017/0108079 | A1 | 4/2017 | Shakushiro et al. | |
| 2017/0158224 | A1 * | 6/2017 | Oh | F16G 1/10 |
| 2017/0284530 | A1 * | 10/2017 | Lee | F16H 55/566 |
| 2018/0149242 | A1 * | 5/2018 | Lacy | F16H 7/08 |
| 2018/0245672 | A1 * | 8/2018 | Konno | F16G 1/28 |
| 2018/0313430 | A1 * | 11/2018 | Ochoa | B29D 29/08 |
| 2019/0011020 | A1 * | 1/2019 | Lacy | F01L 1/047 |
| 2019/0085938 | A1 * | 3/2019 | Yoshida | B62D 5/0424 |
| 2020/0049230 | A1 * | 2/2020 | Suzuki | F16G 1/28 |
| 2020/0232540 | A1 * | 7/2020 | Ikegami | F16G 1/08 |

FOREIGN PATENT DOCUMENTS

| | | | | |
|---|---|---|---|---|
| CN | 102138028 | A | 7/2011 | |
| CN | 106170641 | A | 11/2016 | |
| DE | 112013005915 | T5 * | 9/2015 | ............... F16G 1/08 |
| EP | 2803879 | A1 | 11/2014 | |
| JP | 2004-308702 | A | 11/2004 | |
| JP | 2008-286301 | A | 11/2008 | |
| JP | 2009-257344 | A | 11/2009 | |
| JP | 2010-096229 | A | 4/2010 | |
| JP | 2017180825 | A * | 10/2017 | ............... B62D 5/04 |
| KR | 2015-0098620 | A | 8/2015 | |
| WO | WO-2014024377 | A1 * | 2/2014 | ............... B62D 3/02 |
| WO | WO-2014091672 | A1 * | 6/2014 | ............... F16G 1/08 |
| WO | 2017-164135 | A1 | 9/2017 | |

OTHER PUBLICATIONS

JP 20171800825 A1 Translated copy from Google Patents (Year: 2017).*
DE 112013005915 T5 Translated copy from Google Patents (Year: 2013).*
DE 2013005915 T5 Nakashima (Year: 2015).*
Nov. 2, 2021—(CA) Office Action—App 3,095,697.
Nov. 29, 2021—(EP) Extended Search Report—App 19782083.0.
Mar. 25, 2022—(CA) Office Action—App 3,095,697.
Jul. 21, 2021—(CN) Notification of First Office Action—App 201980019647.X.
Jan. 13, 2022—(KR) Office Action—App 10-2020-7026644.
Jan. 42, 2022—(CN) Notification of the Second Office Action—App 201980019647.X.
May 27, 2022—(CN) Decision of Rejection—App 201980019647.X.
Nov. 2019—(TW) Office Action—App 108111261.
Jun. 11, 2019—International Search Report—Intl App PCT/JP2019/013477.
Jul 2, 2024—(EP) Office Action—App 19782083.0.

* cited by examiner

[FIG. 1]
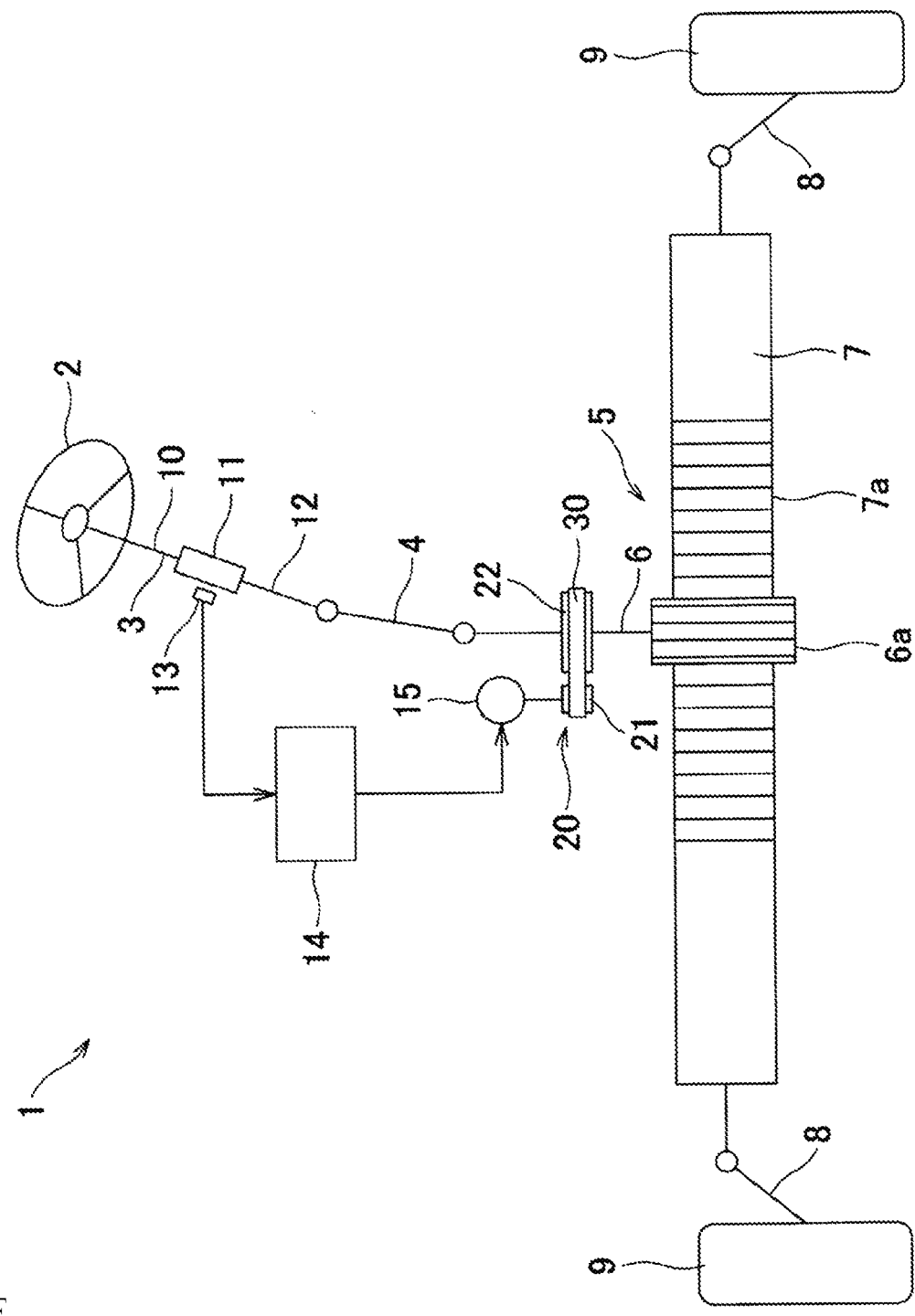

[FIG. 2]
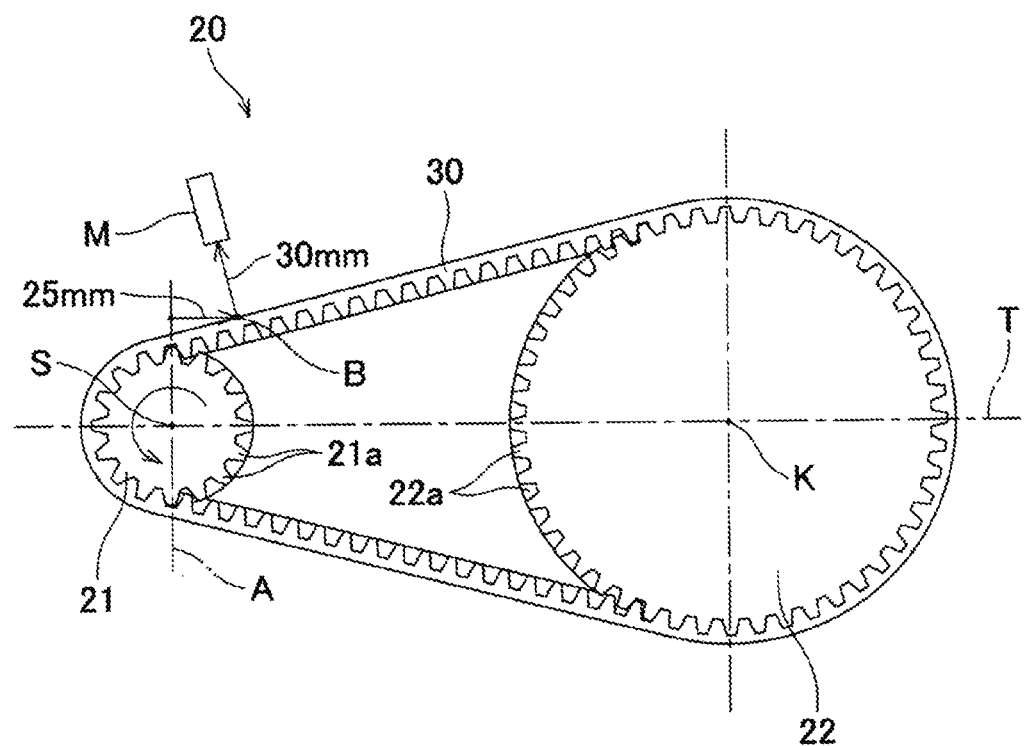

[FIG. 3]
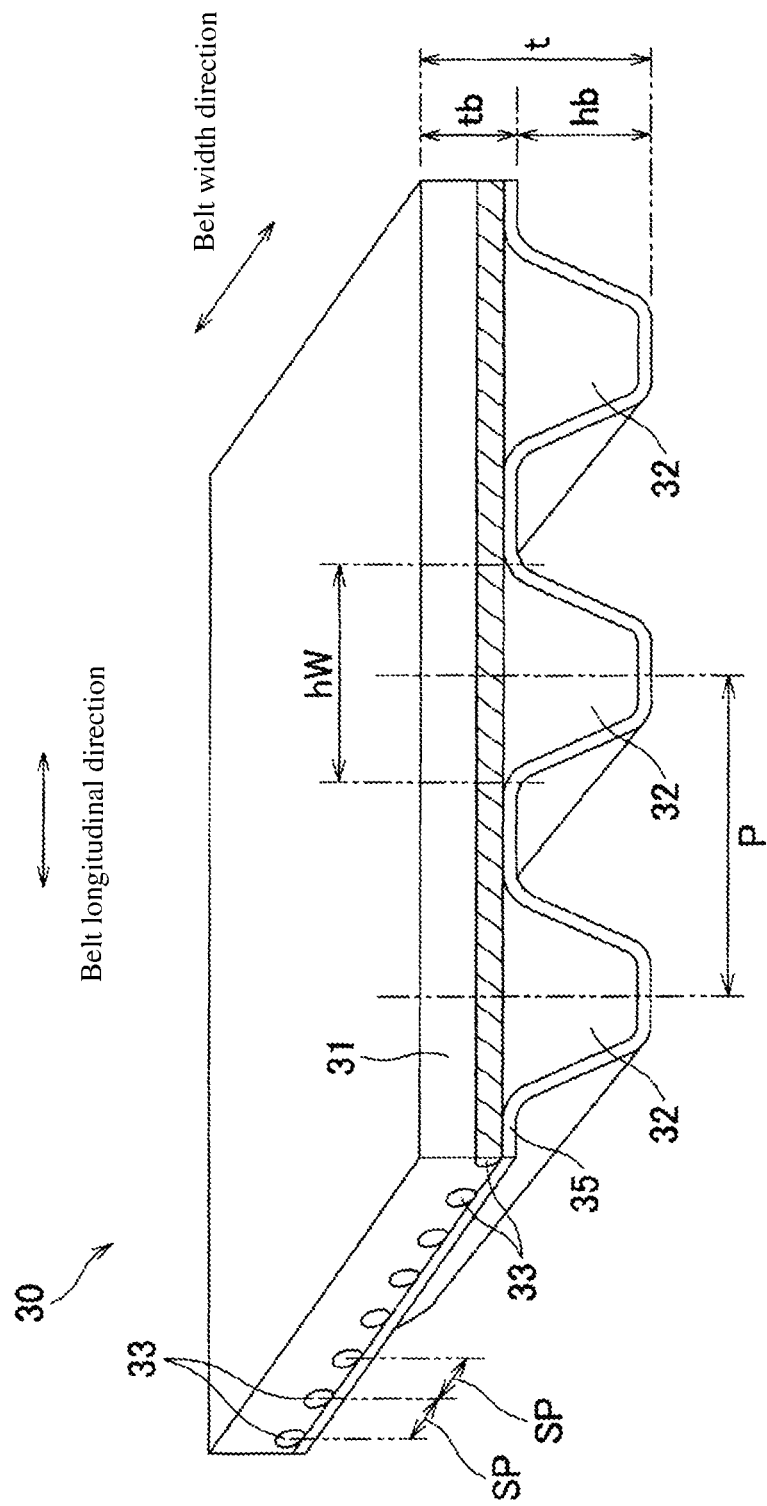

[FIG. 4]
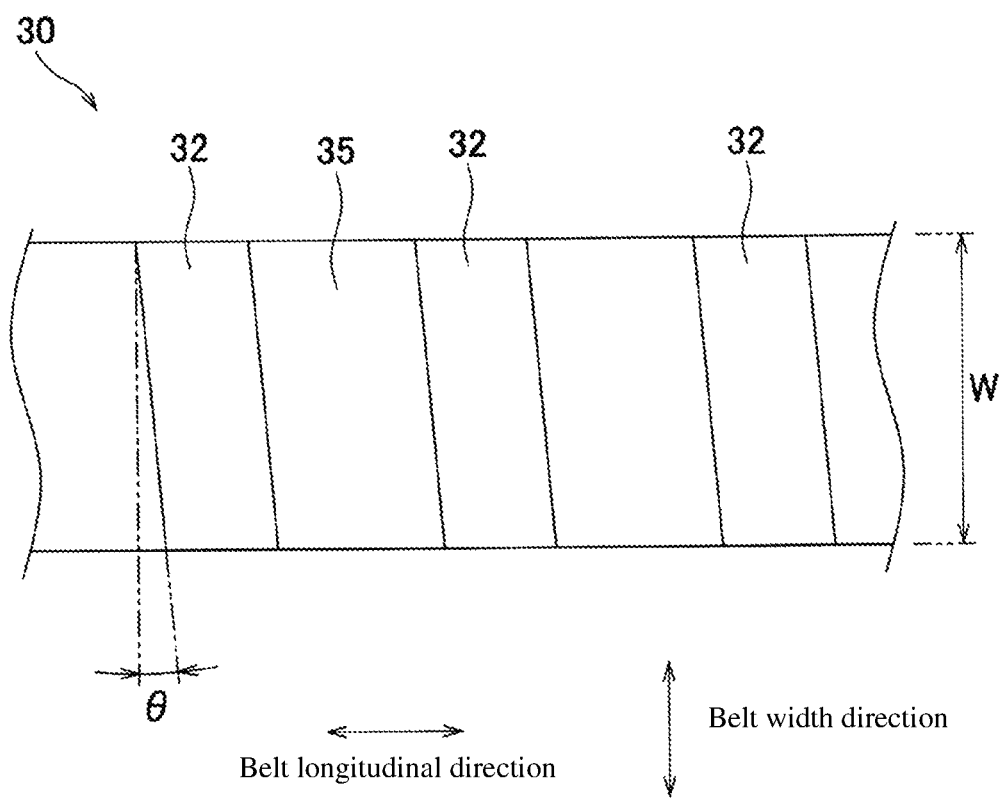

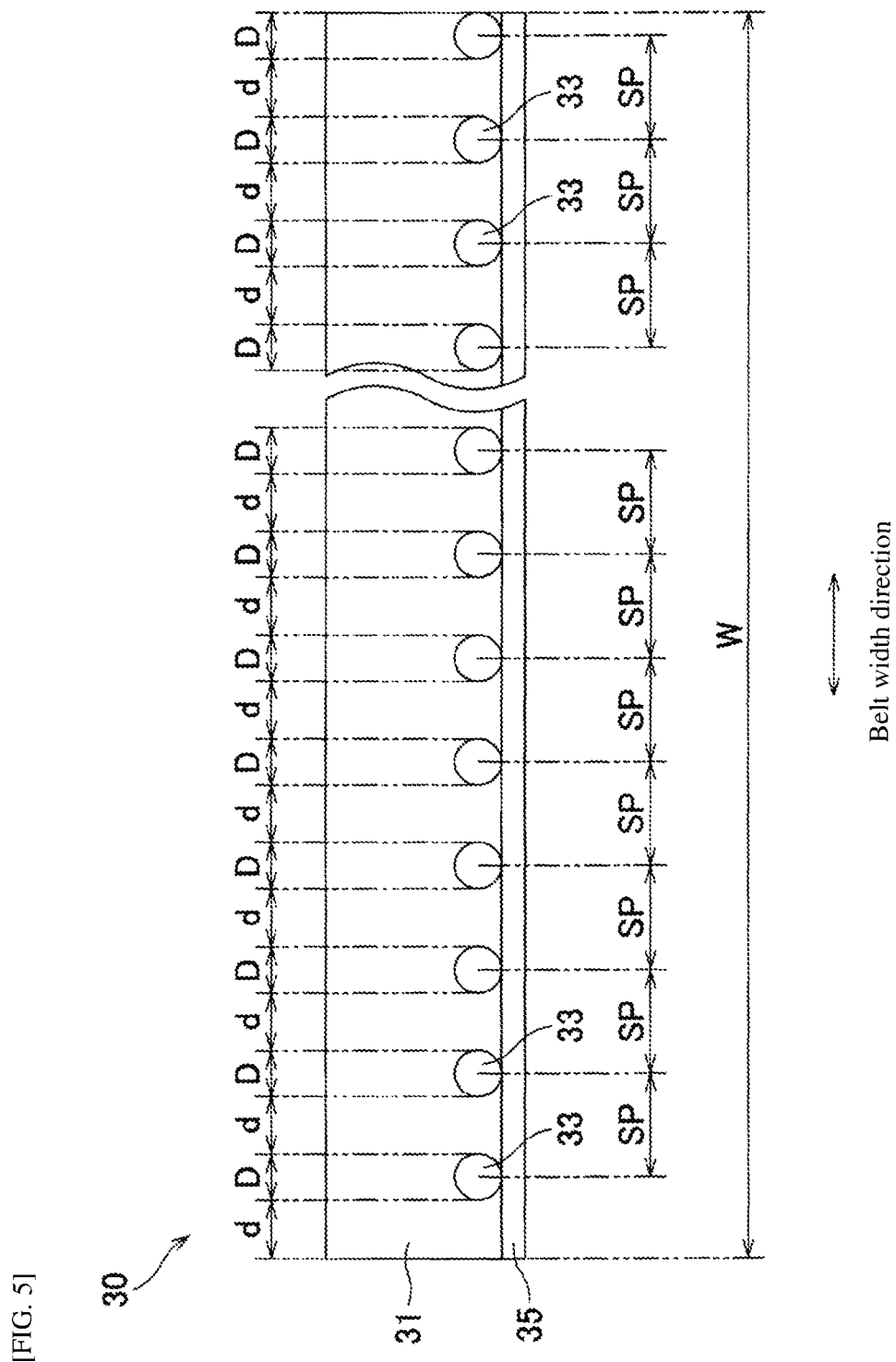
[FIG. 5]

[FIG. 6]
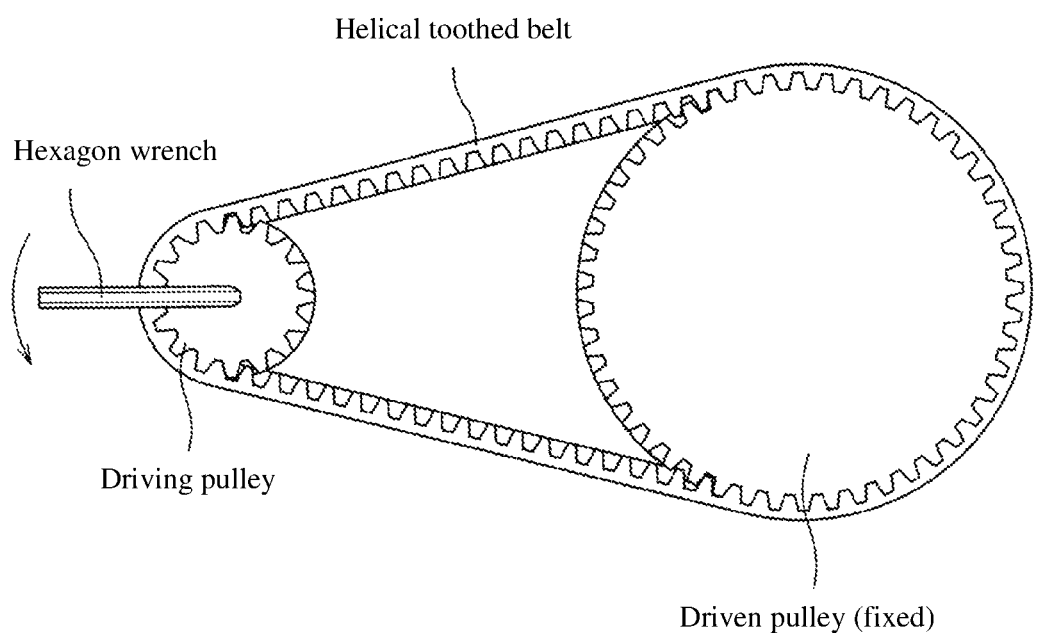

HELICAL TOOTH BELT AND BELT TRANSMISSION

CROSS REFERENCE TO RELATED APPLICATIONS:

This is a U.S. National Phase Application under 35 U.S.C. § 371 of International Application No. PCT/JP2019/013477, filed Mar. 27, 2019, which claims priority to Japanese Application Nos. 2018-073961, filed Apr. 6, 2018, and 2019-057682, filed Mar. 26, 2019, which was published Under PCT Article 21(2), the entire contents of which are incorporated herein by reference.

TECHNICAL FIELD

The present invention relates to a helical toothed belt, particularly to a helical toothed belt which is applied to a belt power transmission device driven with high load or high-speed rotation, and relates to the belt power transmission device.

BACKGROUND ART

For example, in a belt power transmission device driven with high load or high-speed rotation, like in a deceleration device of an electric power steering apparatus, in the case where a straight toothed belt having tooth portions extending parallel to a belt width direction is used, large noise and vibration are generated at the time of starting and ending of the meshing between the tooth portions thereof and tooth portions of a pulley. As a countermeasure to this problem, a helical toothed belt in which the tooth portions are disposed obliquely to the belt width direction has been used. In the helical toothed belt, the meshing between the tooth portions thereof and the tooth portions of the pulley progresses sequentially from one end to the other end of the tooth portions in the width direction. Therefore, noise and vibration can be reduced as compared with a belt power transmission device using the straight toothed belt.

However, even in the case where the helical toothed belt is used, noise and vibration cannot be reduced necessarily and sufficiently in some cases. Therefore, Patent Literature 1 and Patent Literature 2 propose techniques for further reducing noise and vibration in a belt power transmission device using a helical toothed belt and driven with high load or high-speed rotation, for example.

In Patent Literature 1, when a tooth pitch is denoted Pt and a belt width is denoted W, a tooth trace angle θ is set to a value that satisfies $-0.2 \leq 1 - W \cdot \tan \theta / Pt \leq 0.75$. In addition, the backlash (gap) between tooth portions of the helical toothed belt and tooth portions of a pulley is set to 1.6% to 3% of the tooth pitch Pt.

In Patent Literature 2, the tooth trace angle θ is set to 7 degrees or more and 10 degrees or less. In addition, when a thickness of a back portion is denoted tb and a tooth height of a tooth portion is denoted hb, a ratio (100×tb/hb) of the thickness tb to the tooth height hb is set to 120% or more and 240% or less.

Recently, since the quietness of vehicles is advancing, for example, a belt power transmission device such as a deceleration device of an electric power steering apparatus is required to further reduce noise. However, with the techniques of Patent Literature 1 and Patent Literature 2, noise and vibration cannot be reduced to a satisfactory level.

CITATION LIST

Patent Literature

Patent Literature 1: JP-A 2004-308702
Patent Literature 2: WO 2014/024377

SUMMARY OF INVENTION

Technical Problems

In order to reduce noise and vibration, it is conceivable to increase the rigidity (elastic modulus) of the helical toothed belt. A method of increasing the rigidity includes a method of increasing the thickness of the helical toothed belt (particularly the thickness of the back portion). However, even if vibration or noise can be suppressed by this method, since a bendability of the helical toothed belt is deteriorated, the bending fatigue on the pulley increases, and cracks are likely to occur especially in a low temperature environment. Therefore, it is necessary to increase the rigidity without increasing the thickness of the helical toothed belt, and to secure sufficient bending fatigue resistance.

On the other hand, in order to suppress vibration and noise, it is necessary to secure transmission performance of the helical toothed belt (e.g., not tooth skipping (jumping) when meshing with a pulley around which the helical toothed belt is wound).

Therefore, an object of the present invention is to provide a helical toothed belt that can increase rigidity without increasing the thickness of the helical toothed belt and can further reduce noise and vibration while maintaining transmission performance in the case of being used in a belt power transmission device driven with high load or high-speed rotation.

Solution to Problem

A helical toothed belt according to the present invention for solving the above problem is a helical toothed belt including:

a back portion;
a tension member buried in the back portion and arranged in a belt width direction; and
a plurality of tooth portions that are arranged at a predetermined interval along a belt longitudinal direction on one surface of the back portion and each are inclined with respect to a belt width direction,
in which a surface of the tooth portion and a portion of the one surface of the back portion are formed of a tooth fabric,
the plurality of tooth portions have a tooth pitch of 1.5 mm or more and less than 2.0 mm,
the back portion has a thickness of 0.4 mm or more and 1.2 mm or less,
the tension member is formed of a twisted cord containing a high-strength glass fiber or a carbon fiber, and
the ratio of the total value of an interval between the tension members adjacent to each other in the belt width direction to the belt width is in a range of 20% or more and 60% or less.

According to the above-described configuration, since a surface on a tooth portion side of the back portion is formed of a tooth fabric, the back portion is reinforced and the rigidity is increased. In addition, the tension member buried in the back portion is formed of a twisted cord containing a high-strength glass fiber or a carbon fiber, which is a high-strength (high elastic modulus) fiber material, and the total value of the interval between the tension members adjacent to each other in the belt width direction is in the range of 20% or more and 60% or less. Therefore, the density of the tension member arrangement can be made relatively dense. Thus, the rigidity of the back portion can be further increased by the tension member while securing the bendability of the back portion.

The rigidity of the back portion is increased as described above. Therefore, even in the case where the helical toothed belt is used in a belt power transmission device driven with high load or high-speed rotation, vibration (string vibration) about the tension member of the helical toothed belt, generated when the tooth portions mesh with the tooth portions of the pulley can be suppressed. Therefore, noise generated by vibration can be reduced.

In addition, in the helical toothed belt, the tooth pitch is 1.5 mm or more and less than 2.0 mm, the thickness of the back portion is 0.4 mm or more and 1.2 mm or less. With respect to these values, for example, the thickness of the back portion is approximately the same as that of a conventional helical toothed belt used in a deceleration device of an electric power steering device for vehicles, but the tooth pitch is relatively small. Since the tooth pitch has a relatively small value as described above, the scale of the tooth portion (the length of the tooth portion in the belt longitudinal direction and the tooth height of the tooth portion) is correspondingly small. Therefore, compared with the conventional helical toothed belt, the rigidity of the back portion can be increased without increasing the thickness of the back portion, and the bending fatigue resistance can be sufficiently secured. In addition, the vibration and noise can be further suppressed since the scale of the tooth portion (the length of the tooth portion in the belt longitudinal direction and the tooth height of the tooth portion) is relatively small.

Furthermore, in one aspect of the present invention, in the above-mentioned helical toothed belt, the tension member has a diameter in a range of 0.2 mm or more and 0.6 mm or less.

According to this configuration, the diameter of the tension member is 0.2 mm or more and 0.6 mm or less. Therefore, the rigidity of the back portion can be further increased by the tension member while securing the bendability of the back portion.

According to one aspect of the present invention, in the above-mentioned helical toothed belt, the tension members are arranged such that each tension member pitch between the adjacent tension members is in a range of 0.45 mm or more and 1.0 mm or less.

In this configuration, the tension members buried in the back portion are arranged such that each tension member pitch between the tension members is in a range of 0.45 mm or more and 1.0 mm or less. As a result, the rigidity of the helical toothed belt can be further increased without further increasing the thickness of the back portion or increasing the diameter of the tension member (i.e., without sacrificing bendability).

According to one aspect of the present invention, in the above-mentioned helical toothed belt, the tension members buried in the back portion are arranged such that the tension member pitch is a constant value in a range of 0.45 mm or more and 1.0 mm or less from one end to the other end of the helical toothed belt in the belt width direction.

According to this configuration, the rigidity of the helical toothed belt can be further increased without further increasing the thickness of the back portion or increasing the diameter of the tension member (i.e., without sacrificing bendability), and vibration and noise can be further suppressed.

In one aspect of the present invention, in the above-mentioned helical toothed belt, the tooth portion has a tooth height in a range of 0.6 mm or more and 1.0 mm or less, and has a height in a range of 40% to 50% relative to the tooth pitch.

When the tooth pitch, that is, the scale of the tooth portion (the length of the tooth portion in the belt longitudinal direction and the tooth height of the tooth portion) is reduced, vibration and noise can be further suppressed. On the other hand, when the scale of the tooth portion is too small, it is concerned that tooth skipping (jumping) is likely to occur when meshing with the pulley around which the helical toothed belt is wound. Therefore, it is necessary to balance the suppression of vibration and noise with the difficulty of the occurrence of tooth skipping (jumping).

In the helical toothed belt having the above-mentioned configuration, the tooth height of the tooth portion is limited to a height in a range of 0.6 mm or more and 1.0 mm or less and 40% to 50% of the tooth pitch. Therefore, it is possible to achieve running balancing between suppression of vibration and noise and the difficulty of the occurrence of tooth skipping (jumping) even in the case of being used in a belt power transmission device driven with high load or high-speed rotation.

In one aspect of the present invention, in the above-mentioned helical toothed belt, the back portion contains a rubber component, and the rubber component contains at least an ethylene-propylene-diene terpolymer or hydrogenated nitrile rubber.

According to this configuration, vibration and noise can be further suppressed.

In one aspect of the present invention, in the above-mentioned helical toothed belt, the tooth fabric is formed of a woven fabric including warp yarns and weft yarns, and the warp yarns or the weft yarns are disposed so as to extend in the belt longitudinal direction, and the warp yarns or the weft yarns disposed so as to extend in the belt longitudinal direction contains an elastic yarn having stretchability.

According to this configuration, vibration and noise can be further suppressed.

In one aspect of the present invention, in the above-mentioned helical toothed belt, the tooth fabric is formed of fibers containing at least one kind of fibers selected from the group consisting of nylon, aramid, polyester, polybenzoxazole, and cotton.

According to this configuration, vibration and noise can be further suppressed.

In one aspect of the present invention, in the above-mentioned helical toothed belt, another surface of the back portion is formed of a back fabric, and the back fabric is formed of fibers containing at least one kind of fibers selected from the group consisting of nylon, aramid and polyester.

According to this configuration, since the other surface of the back portion is formed of the back fabric, and the fibers constituting this back fabric contains at least one kind of fibers selected from the group consisting of nylon, aramid and polyester, the back portion is further reinforced to increase the rigidity.

Furthermore, in one aspect of the present invention, the above-mentioned helical toothed belt has a belt elastic modulus of 22 N/% or more, the belt elastic modulus defined by a belt tension (N) per 1 mm of the belt width with respect to a belt elongation rate (%) when the belt is wound around pulleys with a predetermined mounting tension.

According to this configuration, it is possible to define the helical toothed belt in which the rigidity of the back portion is increased while securing bendability, by the belt elastic modulus. Thus, the designer can objectively determine the design specifications of the back portion of the helical toothed belt.

Furthermore, the belt power transmission device of the present invention is a belt power transmission device including:
a driving pulley rotationally driven by a driving source;
a driven pulley; and
the above-described helical toothed belt wound around the driving pulley and the driven pulley.

According to this configuration, noise and vibration can be reduced in a belt power transmission device that transmits a driving force of the driving pulley to the driven pulley.

In one aspect of the present invention, in the above-mentioned belt power transmission device, the driving pulley has a rotational speed of 1,000 rpm or more and 4,000 rpm or less.

According to this configuration, noise and vibration can be sufficiently reduced in the belt power transmission device driven with high-speed rotation.

In one aspect of the present invention, in the above-mentioned belt power transmission device, the driven pulley is applied a load of 0.5 kW or more and 3 kW or less.

According to this configuration, noise and vibration can be sufficiently reduced in the belt power transmission device driven with high load.

In one aspect of the present invention, in the above-mentioned belt power transmission device, the driven pulley has an outer diameter larger than an outer diameter of the driving pulley, and the belt power transmission device is a deceleration device of an electric power steering apparatus for vehicles.

According to this configuration, noise and vibration can be sufficiently reduced in the deceleration device of the electric power steering apparatus for vehicles.

Advantageous Effects of Invention

A helical toothed belt that increases rigidity without increasing the thickness of the helical toothed belt, and can further reduce noise and vibration while maintaining transmission performance in the case of being used in a belt power transmission device driven with high load or high-speed rotation, can be provided.

BRIEF DESCRIPTION OF DRAWINGS

FIG. 1 is a schematic diagram illustrating a schematic configuration of an electric power steering apparatus to which a helical toothed belt of the present embodiment is applied.

FIG. 2 is a side view illustrating a deceleration device of an electric power steering apparatus.

FIG. 3 is a partial perspective view illustrating a helical toothed belt.

FIG. 4 is a view illustrating a helical toothed belt viewed from the inner peripheral side.

FIG. 5 is a cross-sectional view illustrating the helical toothed belt in the belt width direction.

FIG. 6 is an explanatory diagram of a two-axis torque measurement tester used in a jumping test.

DESCRIPTION OF EMBODIMENTS

Hereinafter, an embodiment of the present invention will be described. A helical toothed belt 30 of the present embodiment is used, for example, in a deceleration device 20 (belt power transmission device) of an electric power steering device 1 for vehicles illustrated in FIG. 1.

[Configuration of Electric Power Steering Apparatus]

The electric power steering (EPS) apparatus 1 contains a steering shaft 3 that is connected to a steering wheel 2, an intermediate shaft 4 that is connected to the steering shaft 3, and a steering mechanism 5 that is connected to the intermediate shaft 4 and steers wheels 9 by interlocking with the rotation of the steering wheel 2.

The steering mechanism 5 contains a pinion shaft 6 that is connected to the intermediate shaft 4, and a rack shaft 7 that is meshed with the pinion shaft 6. The rack shaft 7 extends along a left-right direction of the vehicle. A rack 7a that meshes with a pinion 6a provided on the pinion shaft 6 is formed in a middle portion of the rack shaft 7 in the axial direction. The wheels 9 are connected to both end portions of the rack shaft 7 via tie rods 8 and knuckle arms (not illustrated). The rotation of the steering wheel 2 is transmitted to the pinion shaft 6 via the steering shaft 3 and the intermediate shaft 4. The rotation of the pinion shaft 6 is converted into the axial movement of the rack shaft 7. As a result, the wheels 9 are steered.

The electric power steering apparatus 1 is configured to obtain a steering assisting force depending on the steering torque applied to the steering wheel 2. As a means for this, the electric power steering apparatus 1 contains a torque sensor 13 that detects the steering torque, a control device 14, an electric motor 15 (driving source) for steering assist, and the deceleration device 20 as a transmission device that transmits a driving force of the electric motor 15 to the steering mechanism 5.

In order to detect the steering torque by the torque sensor 13, the steering shaft 3 has an input shaft 10, a torsion bar 11 and an output shaft 12. When the steering wheel 2 is operated and a steering torque is input to the input shaft 10, the torsion bar 11 is twisted and deformed, and the input shaft 10 and the output shaft 12 rotate relatively to each other. The torque sensor 13 detects the steering torque input to the steering wheel 2 based on the relative rotational displacement amount between the input shaft 10 and the output shaft 12. The detection result of the torque sensor 13 is input to the control device 14. The control device 14 controls the electric motor 15 based on the steering torque or the like detected by the torque sensor 13.

The deceleration device 20 contains a driving pulley 21, a driven pulley 22, and the helical toothed belt 30 wound around the driving pulley 21 and driven pulley 22. The driven pulley 22 has an outer diameter larger than that of the driving pulley 21. The driving pulley 21 is fixed to the rotation shaft of the electric motor 15. The driven pulley 22 is fixed to the pinion shaft 6. As illustrated in FIG. 2, a plurality of helical teeth 21a are formed on the outer peripheral surface of the driving pulley 21. A plurality of helical teeth 22a are formed on the outer peripheral surface of the driven pulley 22. The rotation speed of the driving pulley 21 is, for example, 1,000 rpm or more and 4,000 rpm or less. The load of the driven pulley 22 is, for example, 0.5 kW or more and 3 kW or less.

When the steering wheel 2 is operated, the steering torque is detected by the torque sensor 13, and the control device 14 drives the electric motor 15. When the electric motor 15 rotates the driving pulley 21, the helical toothed belt 30 runs to rotate the driven pulley 22 and the pinion shaft 6. The rotational force of the electric motor 15 is reduced by the deceleration device 20 and is transmitted to the pinion shaft 6. In addition, as described above, the rotation of the steering wheel 2 is transmitted to the pinion shaft 6 via the steering shaft 3 and the intermediate shaft 4. Then, the rotation of the pinion shaft 6 is converted into the movement of the rack shaft 7 in the axial direction, whereby the wheels 9 are steered. Accordingly, the rotation of the pinion shaft 6 is assisted by the electric motor 15, so that the steering of the driver is assisted.

The configuration of the electric power steering apparatus 1 to which the helical toothed belt 30 of the present invention can be applied is not limited to the configuration illustrated in FIG. 1. For example, the driven pulley 22 of the deceleration device 20 may be fixed to the intermediate shaft 4 or the steering shaft 3. In addition, for example, the driven pulley 22 of the deceleration device 20 may be connected to the rack shaft 7 via a conversion mechanism. The conversion mechanism may be, for example, a ball screw mechanism or a bearing screw mechanism, and converts the rotational force of the driven pulley 22 into a force in the axial direction of the rack shaft 7 and transmits the force to the rack shaft 7.

[Configuration of Helical Toothed Belt]

As illustrated in FIG. 3, the helical toothed belt 30 includes a back portion 31 in which a tension member 33 is spirally buried along the belt longitudinal direction, and a plurality of tooth portions 32 provided at predetermined intervals along the belt longitudinal direction at an inner peripheral surface of the back portion 31 (corresponding to one surface of the back portion 31). In the present embodiment, the plurality of tooth portions 32 are integrally formed on the inner peripheral surface of the back portion 31. As illustrated in FIG. 4, the tooth portions 32 extend in an inclined manner with respect to the belt width direction. An inner peripheral surface of the helical toothed belt 30, that is, the surface of the tooth portion 32 and a portion of the inner peripheral surface of the back portion 31 are covered with a tooth fabric 35. In the present embodiment, an outer peripheral surface of the back portion 31 (corresponding to the other surface of the back portion 31) is not covered with fabric or the like, but may be covered with a back fabric.

A perimeter of the helical toothed belt 30 is, for example, from 150 mm to 400 mm In this specification, the numerical range represented by "(from) X to Y" means "X or more and Y or less". The width W (see FIG. 4) of the helical toothed belt 30 is, for example, from 4 mm to 30 mm The tooth pitch P (see FIG. 3) of the tooth portion 32 is 1.5 mm or more and less than 2.0 mm, and preferably from 1.6 mm to 1.8 mm. In the case where the tooth pitch P is 1.5 mm or more and less than 2.0 mm, the thickness tb (see FIG. 3) of the back portion 31 is from 0.4 mm to 1.2 mm. The tooth height hb (see FIG. 3) of the tooth portion 32 is in a range of 0.6 mm or more and 1.0 mm or less, and is a height in a range of 40% to 50% with respect to the tooth pitch P. For example, in the case where the tooth pitch P is 1.5 mm, the tooth height hb is a height in the range of 0.6 mm to 0.75 mm, and in the case where the tooth pitch P is 1.99 mm, the tooth height hb is in the range of 0.796 mm to 0.995 mm. The total thickness (maximum thickness) t (see FIG. 3) of the helical toothed belt 30 is the sum of the thickness tb of the back portion 31 and the tooth height hb. The inclination angle θ (see FIG. 4) of the tooth portion 32 with respect to the belt width direction is, for example, 2° to 7°, and preferably 2° to 6°.

As described above, in the present embodiment, the tooth pitch P (1.5 mm or more and less than 2.0 mm) of the helical toothed belt 30 is relatively small compared to the conventional helical toothed belt. Since the tooth pitch P has a relatively small value as described above, correspondingly, the scale of the tooth portion 32 (the length hW of the tooth portion 32 in the belt longitudinal direction and the tooth height hb of the tooth portion 32: see FIG. 3) is also reduced. As a result, compared with the conventional helical toothed belt, the rigidity of the back portion 31 can be increased without increasing the thickness of the back portion 31, and bending fatigue resistance can be sufficiently secured. In addition, since the scale of the tooth portion 32 (the length hW of the tooth portion 32 in the belt longitudinal direction and the tooth height hb of the tooth portion 32) can be made relatively small, vibration and noise can be further suppressed.

When the tooth pitch P, that is, the scale of the tooth portion 32 (the length hW of the tooth portion 32 in the belt longitudinal direction, and the tooth height hb of the tooth portion 32) is reduced, vibration and noise can be further suppressed. On the other hand, when the scale of the tooth portion 32 is too small, there is a concern that the tooth skipping (jumping) will be likely to occur in the engagement with the driving pulley 21 and the driven pulley 22 around which the helical toothed belt 30 is wound. Accordingly, the tooth height hb of the tooth portion 32 is limited to a height in a range of 0.6 mm or more and 1.0 mm or less, and to a height in the range of 40% to 50% with respect to the tooth pitch P. As a result, it is possible to perform running balancing the suppression of vibration and noise with the difficulty in the occurrence of tooth skipping (jumping) even in the case where the helical toothed belt 30 is used in the deceleration device 20 driven with high load or high-speed rotation.

[Back Portion and Tooth Portion]

The back portion 31 and the tooth portion 32 are formed of a rubber composition, and as the rubber components of this rubber composition, use can be made of chloroprene rubber (CR), nitrile rubber, hydrogenated nitrile rubber (HNBR), ethylene-propylene copolymer (EPM), ethylene-propylene-diene terpolymer (EPDM), styrene-butadiene rubber, butyl rubber, chlorosulfonated polyethylene rubber, or the like. These rubber components can be used alone or in combination. A preferred rubber component is an ethylene-propylene-diene terpolymer (EPDM), and chloroprene rubber and hydrogenated nitrile rubber (HNBR) are also suitably used. A particularly preferred rubber composition has a configuration containing at least an ethylene-propylene-diene terpolymer (EPDM) or hydrogenated nitrile rubber (HNBR). In the present embodiment, the back portion 31 and the tooth portion 32 are formed of the same rubber composition with each other, but may be formed of different rubber compositions from each other.

The rubber composition constituting the back portion 31 and the tooth portion 32 may contain various conventional additives (or compounding agents), if necessary. Examples of the additives include vulcanizing agents or crosslinking agents (e.g., oximes (quinone dioxime, etc.), guanidines (diphenylguanidine, etc.), metal oxides (magnesium oxide, zinc oxide, etc.)), vulcanization aids, vulcanization accelerators, vulcanization retarders, reinforcing agents (carbon black, silicon oxide such as hydrated silica, etc.), metal oxides (e.g., zinc oxide, magnesium oxide, calcium oxide, barium oxide, iron oxide, copper oxide, titanium oxide, aluminum oxide, etc.), fillers (clay, calcium carbonate, talc, mica, etc.), plasticizers, softening agents (oils such as paraffin oil and naphthenic oil, etc.), processing agents or processing aids (stearic acid, metal salts of stearic acid, wax, paraffin, etc.), anti-aging agents (aromatic amine type or benzimidazole type anti-aging agents, etc.), stabilizers (anti-oxidizing agents, ultraviolet absorbers, heat stabilizers, etc.), lubricants, flame retardants, antistatic agents, and the like. These additives can be used alone or in combination, and can be selected according to the kind, application, performance, or the like of the rubber component.

[Tension Member]

The tension members 33 are spirally buried in the back portion 31 along the belt longitudinal direction at a predetermined interval d (0.5 mm or more and 0.6 mm or less) in the belt width direction. That is, as illustrated in FIG. 5, the tension members 33 are arranged on the back portion 31 at the predetermined interval d in the belt width direction. More specifically, the tension members 33 are buried in the back portion 31 such that the ratio (%) of the total value of the interval d between the tension member 33 and the tension member 33 adjacent to each other in the belt width direction to the belt width W is in the range of 20% or more and 60% or less (preferably 20% or more and 40% or less). The total value of the interval d between the tension member 33 and the tension member 33 adjacent to each other in the belt width direction also includes an interval between an end of the belt and the tension member 33 (both end portions). That is, it can be said that the total value of the interval d between the tension member 33 and the tension member 33 adjacent to each other in the belt width direction of the present invention is a value obtained by subtracting the value of "the sum of the tension member diameters (the tension member diameter x the number of the tension members)" from the value of the "belt width". Therefore, the ratio (%) of the total value of the interval d between the tension member 33 and the tension member 33 adjacent to each other in the belt width direction to the belt width W can be replaced with a "relational expression of the tension member diameter D and the tension member pitch SP" (see equation 1). Here, as the ratio (%) of the total value of the interval d between the tension member 33 and the tension member 33 adjacent to each other in the belt width direction to the belt width W becomes a smaller value, the interval d between the tension member 33 and the tension member 33 becomes smaller and thus, it can be said that the density of the tension member arrangement becomes relatively denser.

[Equation 1]

$$\text{Ratio of "Sum of intervals } d\text{" to belt width} = \frac{\text{"Sum of intervals } d\text{"}}{\text{Belt width}} \times 100$$

$$= \frac{\text{Belt width} - \text{"Sum of tension member diameters"}}{\text{Belt width}} \times 100$$

$$= \frac{\text{Belt width} - (\text{Tension member diameter} \times \text{Number of tension members})}{\text{Belt width}} \times 100$$

$$\ast \text{Number of tension members} = \frac{\text{Belt width}}{\text{Tension member pitch}}$$

$$= \frac{\text{Belt width} - \left(\text{Tension member diameter} \times \frac{\text{Belt width}}{\text{Tension member pitch}}\right)}{\text{Belt width}} \times 100$$

$$= \left(1 - \frac{\text{Tension member diameter}}{\text{Tension member pitch}}\right) \times 100$$

Furthermore, as illustrated in FIG. 3 and FIG. 5, the tension members 33 are arranged from one end to the other end in the belt width direction of the back portion 31 such that each tension member pitch SP, which is the distance between the centers of the tension member 33 and the tension member 33 spirally buried, is to be a constant value in the range of 0.45 mm or more and 1.0 mm or less. In the present specification, as illustrated in FIG. 5, the apparent number of the tension members arranged at a predetermined tension member pitch SP in the belt width direction in a sectional view is treated as the "number of tension members". That is, in the case where one tension member 33 is spirally buried, the spiral number thereof is set to "the number of tension members".

Here, it is desirable to count only the number (effective number) of the tension members that affect the strength (elastic modulus) of the belt as the "number of tension members". Therefore, it is desirable to count the number of the tension members 33 that are not cut in the cross-sectional view as the effective number without taking into consideration the number of the tension members 33 that are arranged at one end and the other end in the width direction of the back portion 31 of the helical toothed belt 30 and cut to have a non-circular cross-section, as the effective number.

However, in practice, since the tension members 33 are spirally buried, depending on a portion of an endless helical toothed belt 30 whose cross section is to be taken, the arrangement mode of the tension members 33 is different, and even the tension member 33 that is cut and has a non-circular cross-section cannot be ignored its effect on the strength (elastic modulus) of the belt. Therefore, in practice, a value calculated by dividing the belt width by the tension member pitch SP (a constant value in the range of 0.45 mm or more and 1.0 mm or less) and rounding down the calculated value after the decimal point is regarded as the approximate "number of tension members" (effective numbers) in the case where each tension member pitch SP is a constant value in the range of 0.45 mm or more and 1.0 mm or less. For example, in the case where the belt width is 25 mm and the tension member pitch SP is 0.56 mm, the calculated value is 44.64, and the "number of tension members" (effective number) is regarded as 44. In the case where the belt width is 25 mm and the tension member pitch SP is 0.52 mm, the calculated value is 48.07, and the "number of the tension members" (effective number) is regarded as 48. In the case where the belt width is 25 mm and the tension member pitch SP is 0.60 mm, the calculated value is 41.67, and the "number of the tension members" (effective number) is regarded as 41.

The tension member 33 is formed of a twisted cord formed by twisting a plurality of strands. One strand may be formed by bundling and aligning filaments (long fibers). The diameter of the tension member 33 is 0.2 mm to 0.6 mm. There are no particular restrictions on the thickness of the filament forming the twisted cord, the number of filaments bundled, the number of strands, and the twisting configuration such as twisting manner. The material of the filament is high-strength glass fiber or carbon fiber. Both the high-strength glass fiber and the carbon fiber are high in strength and low in elongation, and are suitable as the material of the tension member 33. From the viewpoint of low cost, high-strength glass fiber is more preferable.

As the high-strength glass fiber, for example, one having a tensile strength of 300 kg/cm$^2$ or more and particularly, the glass fiber described in the following Table 1 which contains more Si component than non-alkali glass fiber (E glass fiber) can be suitably used. In Table 1 below, the composition of the E glass fiber is also described for comparison. Examples of such high-strength glass fibers include K glass fiber, U glass fiber (both manufactured by Nippon Glass Fiber Co., Ltd.), T glass fiber (manufactured by Nitto Bosch Co., Ltd.), R glass fiber (manufactured by Vetrotex), S glass fiber, S-2 glass fiber, ZENTRON glass fiber (all manufactured by Owens Corning Fiberglass), and the like.

TABLE 1

| Ingredient item | High-strength glass fiber | E glass fiber |
| --- | --- | --- |
| $SiO_2$ | 58 to 70 | 52 to 56 |
| $Al_2O_3$ | 17 to 27 | 12 to 16 |
| MgO | 7 to 17 | 0 to 6 |
| CaO | 0 to 10 | 12 to 25 |
| $Na_2O$ | 0 to 2 | 0 to 0.8 |
| $K_2O$ | 0 to 2 | 8 to 13 |
| $B_2O_3$ | 0 to 2 | |
| | Impurities such as $Fe_2O_3$ and $TiO_2$ are contained. | |

Examples of the carbon fibers include pitch-based carbon fibers, polyacrylonitrile (PAN)-based carbon fibers, phenol resin-based carbon fibers, cellulose-based carbon fibers, polyvinyl alcohol-based carbon fibers, and the like. As a commercially available product of carbon fibers, "Torayca (registered trademark)" manufactured by Toray Industries, Inc., "Tenax (registered trademark)" manufactured by Toho Tenax Co., Ltd., and "Dialead (registered trademark)" manufactured by Mitsubishi Chemical Co., ltd, and the like can be used. These carbon fibers may be used alone or in combination of two or more thereof. Of these carbon fibers, pitch-based carbon fibers and PAN-based carbon fibers are preferable, and PAN-based carbon fibers are particularly preferable.

Preferably, an adhesive treatment is applied to the twisted cord used as the tension member 33 so as to enhance the adhesion with the back portion 31. As the adhesive treatment, for example, a method in which the twisted cord is immersed in a resorcinol-formalin-latex treatment liquid (RFL treatment liquid) and then dried by heating to form an adhesive layer evenly on the surface, can be adopted. The RFL treatment solution is obtained by mixing an initial condensate of resorcin and formalin with a latex, and examples of the latex used here include chloroprene, styrene-butadiene-vinylpyridine terpolymer (VP latex), hydrogenated nitrile, NBR, and the like. As the adhesive treatment, there is also a method of pretreating with an epoxy or isocyanate compound and then treating with the RFL treatment liquid, or the like.

[Tooth Fabric]

The tooth fabric 35 is preferably formed of a woven fabric woven by vertically and horizontally interlacing warp yarns and weft yarns according to a predetermined rule. The weaving manner of the woven fabric may be any of twill weave, satin weave and the like. The form of a warp yarn and a weft yarn may be any of a multifilament yarn obtained by aligning or twisting filaments (long fibers), a monofilament yarn as one long fiber, and a spun yarn obtained by twisting short fibers together. In the case where the warp yarn or weft yarn is a multifilament yarn or a spun yarn, it may be a blended twisted yarn or a blended spun yarn using a plurality of types of fibers. The weft yarn preferably contains an elastic yarn having stretchability. As the elastic yarn, for example, use can be made of a material itself having stretchability, such as spandex made of polyurethane, or a processed yarn obtained by stretching (e.g., woolly processing, crimping processing, etc.) of a fiber(s). Normally, elastic yarn is not used for a warp yarn. Therefore, the weaving is easy. As the tooth fabric 35, it is preferable that the warp yarns of the woven fabric are disposed to extend in the belt width direction and the weft yarns are disposed to extend in the belt longitudinal direction. Accordingly, stretchability of the tooth fabric 35 in the belt longitudinal direction can be secured. The tooth fabric 35 may be disposed so that the weft yarns of the woven fabric are disposed to extend in the belt width direction and the warp yarns are disposed to extend in the belt longitudinal direction. In this case, the elastic yarn having stretchability may be used as the warp yarn. As the material of the fibers constituting the tooth fabric 35, any one or combination of nylon, aramid, polyester, polybenzoxazole, cotton, and the like can be adopted.

The woven fabric used as the tooth fabric 35 may be subjected to an adhesive treatment so as to enhance the adhesion with the back portion 31 and the tooth portion 32. As the adhesive treatment, a method of immersing the woven fabric in a resorcinol-formalin-latex (RFL liquid), and then heating and drying to uniformly form an adhesive layer on the surface thereof, is generally used. However, the present invention is not limited thereto, and a method of pretreating with an epoxy or isocyanate compound and then treating with the RFL liquid, as well as a method in which a rubber composition is dissolved in an organic solvent such as methyl ethyl ketone, toluene or xylene to form a rubber paste and the woven fabric is dipped in this rubber paste so as to impregnate and adhere the rubber composition, can also be adopted. These methods can be performed singly or in combination, and the order of processing and the number of times of processing are not particularly limited.

[Back Fabric]

In the present embodiment, the outer peripheral surface of the back portion 31 (corresponding to the other surface of the back portion 31) is not covered by fabric or the like, but may be covered with a back fabric 36. In the case where the outer peripheral surface of the back portion 31 is covered with the back fabric 36, the back fabric 36 is preferably formed of a knitted fabric knitted with knitting yarns or a woven fabric woven by vertically and horizontally interlacing warp yarns and weft yarns according to a predetermined rule.

A knitted fabric is a fabric having a structure knitted in such a manner that one or two or more knitting yarns form a mesh (loop), and the next yarn is hooked to the loop to form a new loop continuously. In other words, the knitted fabric is formed by making loops without linearly interlacing the yarns. In the case of using a knitted fabric for the back fabric 36, the knitted fabric (or knitting manner of knitted fabric) may be either a weft knitting (or knitted fabric knitted by weft knitting) or a warp knitting (or knitted fabric knitted by warp knitting). As the shape of the knitted fabric, it is not limited and may be a planar shape, a cylindrical shape (circular knitting), and the like. In addition, in the knitted fabric, either a front surface or a back surface may be used as the surface to be bonded to the belt main body. Examples of the weft knitting (or knitting structure of weft knitting) include a flat knitting (plain knitting), rubber knitting, pique knitting, Smooth knitting, Jacquard knitting, and the like. Examples of the warp knitting (knitting structure of warp knitting) include single denbigh, single cord, tricot, half tricot, and the like.

In the case of using a woven fabric for the back fabric 36, the weaving manner of the woven fabric may be any of plain weave, twill weave, satin weave, and the like. From the viewpoint of securing the bendability of the helical toothed belt 30, the weaving structure or knitting structure is preferably a form capable of easily stretching in the belt longitudinal direction so as to be likely to bend in the belt longitudinal direction. It is therefore preferable that a woven fabric containing an elastic yarn having stretchability as the weft yarn is used, and the warp yarns of the woven fabric are disposed to extend in the belt width direction and the weft yarns are disposed to extend in the belt longitudinal direction. The form of the knitting yarn of the knitted fabric or the warp yarn and weft yarn of the woven fabric may be any of a multifilament yarn obtained by aligning or twisting filaments (long fibers), a monofilament yarn as one long fiber, and a spun yarn obtained by twisting short fibers together. In the case where the warp yarn or weft yarn is a multifilament yarn or a spun yarn, it may be a blended twisted yarn or a blended spun yarn using a plurality of types of fibers. As the material of the fibers constituting the back fabric 36, any one or combination of nylon, aramid, polyester and the like can be adopted. In this case, the back portion 31 is further reinforced to increase the rigidity of the helical toothed belt 30.

The woven fabric or knitted fabric used as the back fabric 36 may be subjected to an adhesive treatment so as to enhance the adhesion with the back portion 31. As the adhesive treatment, like in the case of the tooth fabric 35, it is preferable that the fabric is immersed in the resorcinol-formalin-latex (RFL liquid) and then is heated and dried to form an adhesive layer evenly on the surface. However, it is not limited thereto. A method of pretreating with an epoxy or isocyanate compound and then treating with the RFL liquid, as well as a method in which a rubber composition is dissolved in an organic solvent such as methyl ethyl ketone, toluene or xylene to form a rubber paste and the fabric is dipped in this rubber paste so as to impregnate and adhere the rubber composition, can also be adopted. These methods can be performed singly or in combination, and the order of processing and the number of times of processing are not particularly limited. In the case where the back fabric 36 is a knitted fabric, in a manufacturing method of the helical toothed belt 30 described below, an unvulcanized rubber sheet wrapped on the knitted fabric in a heating and pressurizing step is impregnated into the knitted fabric. Therefore, an adhesive treatment may not be applied.

Although the details will be described later in the examples, the belt elastic modulus defined by the belt tension (N) per 1 mm of the belt width with respect to the belt elongation ratio (%) when the toothed belt 30 is wound around the pulleys with a predetermined mounting tension is preferably 22 N/% or more (more preferably in the range is 30 N/% or more and 125 N/% or less, and particularly preferably in the range of 30 N/% or more and 50 N/% or less).

[Manufacturing Method of Helical Toothed Belt]

The helical toothed belt 30 is produced, for example, by the following procedure.

First, a woven fabric to form the tooth fabric 35, on which an adhesive treatment has been performed, is wound around a cylindrical mold (not illustrated) having a plurality of groove portions corresponding to the plurality of tooth portions 32 of the helical toothed belt 30. Subsequently, a twisted cord to constitute the tension member 33 is spirally spun around the outer peripheral surface of the wound woven fabric. Then, an unvulcanized rubber sheet to form the back portion 31 and the tooth portion 32 is wound around the outer peripheral side to form an unvulcanized belt molded body.

In the case where the back fabric 36 is covered, after the unvulcanized rubber sheet to form the back portion 31 and the tooth portion 32 is wound, a knitted fabric or a woven fabric that forms the back fabric 36 is wound. In the case where a woven fabric is used as the back fabric 36, it is preferable that the woven fabric is subjected to an adhesive treatment before winding. On the other hand, in the case where a knitted fabric is used as the back fabric 36, adhesive treatment may not be performed.

Next, in a state in which the unvulcanized belt molded body is disposed on the outer periphery of the cylindrical mold, a rubber-made jacket which is a steam shielding material is further covered on the outside thereof. Next, the belt molded body and the cylindrical mold covered with the jacket are accommodated inside a vulcanization can. Then, the belt molded body is heated and pressurized inside the vulcanization can so as to vulcanize the rubber sheet. Thus, the rubber composition of the rubber sheet is press-fitted into the groove portions of the mold, and the tooth portions 32 are formed. Then, the sleeve-like molded body is released from the mold and cut to a predetermined width, whereby a plurality of helical toothed belts 30 can be obtained.

According to the helical toothed belt 30 with the above-described configuration, since the surface of the back portion 31 on the tooth portion 32 side is formed of the tooth fabric 35, the back portion is reinforced to increase the rigidity. In addition, the tension member 33 buried in the back portion 31 is formed of a twisted cord containing a high-strength glass fiber or a carbon fiber, which are a high-strength (high elastic modulus) fiber material, and the ratio of a total value of the interval d between the tension member 33 and the tension member 33 adjacent to each other in the belt width direction to the belt width W is set in a range of 20% or more and 60% or less. Therefore, the density of the tension member arrangement can be made relatively dense. Thus, the rigidity of the back portion 31 can be further increased by the tension member 33 while securing the bendability of the back portion 31.

The rigidity of the back portion 31 is increased in this way. Therefore, even in the case where the helical toothed belt 30 is used in the deceleration device 20 driven with a high load or a high-speed rotation, vibration (string vibration) centered on the tension member 33 of the helical toothed belt 30, which is generated when the tooth portion 32 meshes with the tooth portions of the driving pulley 21 and the driven pulley 22, can be suppressed. Therefore, noise generated by vibration can be reduced.

The diameter D of the tension member 33 is 0.2 mm or more and 0.6 mm or less. Therefore, the rigidity of the back portion 31 can be further increased by the tension member 33 while securing the bendability of the back portion 31.

The tension members 33 buried in the back portion 31 are arranged such that each tension member pitch SP between the tension members are in the range of 0.45 mm or more and 1.0 mm or less. As a result, the rigidity of the helical toothed belt 30 can be further increased without further increasing the thickness of the back portion 31 or increasing the diameter of the tension member 33 (without sacrificing bendability).

Furthermore, in the helical toothed belt 30, the tooth pitch P is 1.5 mm or more and less than 2.0 mm, and the thickness of the back portion 31 is 0.4 mm or more and 1.2 mm or less. With respect to these values, for example, the thickness of the back portion 31 is about the same as that of a conventional helical toothed belt used for the deceleration device 20 of an electric power steering device for vehicles, but the tooth pitch P is relatively small. Since the tooth pitch P has a relatively small value as described above, correspondingly, the scale of the tooth portion 32 (the length hW of the tooth portion 32 in the belt longitudinal direction and the tooth height hb of the tooth portion 32) is also reduced. Therefore, compared with the conventional helical toothed belt, the rigidity of the back portion 31 can be increased without increasing the thickness of the back portion 31 and bending fatigue resistance can be sufficiently secured. In addition, since the scale of the tooth portion 32 (the length hW of the tooth portion 32 in the belt longitudinal direction and the tooth height hb of the tooth portion 32) can be made relatively small, vibration and noise can be further suppressed.

In the helical toothed belt having the above-described configuration, the tooth height hb of the tooth portion 32 is limited to a height in a range of 0.6 mm or more and 1.0 mm or less and 40% to 50% of the tooth pitch P. Therefore, it is possible to achieve running balancing between suppression of vibration and noise and the difficulty of the occurrence of tooth skipping (jumping) even in the case of being used in the deceleration device 20 driven with high load or high-speed rotation.

Furthermore, in the case where the above-described helical toothed belt 30 is used in the deceleration device 20 of an electric power steering apparatus 1 for vehicles in which the outer diameter of the driven pulley 22 is larger than the outer diameter of the driving pulley 21, noise and vibration can be sufficiently reduced.

Although the preferred embodiments of the present invention are described above, the present invention is not limited to the embodiments described above, and various modifications can be made within the range described in the claims.

EXAMPLE

Although the present invention is characterized in that vibration and noise of the helical toothed belt can be reduced by reducing the tooth pitch P compared to a conventional helical toothed belt, since the tooth height hb is also reduced when the tooth pitch P is reduced, there is a concern that tooth skipping (jumping) is likely to occur when meshing with the pulley around which the helical toothed belt is wound. Therefore, in the present invention, it is necessary to achieve both reduction in vibration and noise of the helical toothed belt and difficulty in the occurrence of tooth skipping (jumping) at the same time.

Therefore, in the examples, the helical toothed belts were produced according to Examples 1 to 18 and Comparative Examples 1 to 5, and a sound pressure measurement test and a jumping test were performed to perform comparison verification.

Twisted cords of A1 to A4 having the constitution shown in Table 2 below were prepared as the tension member of the helical toothed belt of Examples 1 to 18 and Comparative Examples 1 to 5.

The twisted cord of A1 was prepared by the following procedure. Glass fiber filaments of the designation KCG 150 described in JIS R 3413 (2012) were bundled and aligned to make three strands. These three strands were immersed in RFL liquid (18° C. to 23° C.) which composition is shown in Table 3 below by letting the strands pass through the RFL liquid for three seconds and heated and dried at 200° C. to 280° C. for three minutes to uniformly form an adhesive layer on the surface. After this adhesive treatment, these three strands were twisted with the number of primary twist of 12 times/10 cm, thereby prepare a single-twisted cord having a diameter of 0.35 mm without giving a final twist. The twisted cords of A2 and A3 were prepared in the same manner as A1, except that the glass fibers were changed to UCG 150 and ECG 150, respectively. The twisted cord A4 was prepared in the same procedure as the tension members of A1 to A3 except that the strand used was one strand formed by bundling and aligning carbon fiber filaments (3K), and was a single-twisted cord having a diameter of 0.53 mm.

(Configuration of Tension Member)

TABLE 2

|  | A1 | A2 | A3 | A4 |
|---|---|---|---|---|
| Material | K glass fiber | U glass fiber | E glass fiber | Carbon fiber |
| Filament diameter (μm) | 9 | 9 | 9 | 7 |
| Strand configuration | KCG150-3/10 | UCG150-3/10 | ECG150-3/10 | 3K-1/0 |
| Number of primary twist (times/10 cm) | 12 | 12 | 12 | 12 |
| Twisting manner | Single twist | Single twist | Single twist | Single twist |
| Cord diameter (mm) | 0.35 | 0.35 | 0.35 | 0.53 |
| Elastic modulus (MPa) | 41.5 | 42.8 | 35.5 | 51.9 |

(Elastic Modulus of Tension Member)

Here, a method of measuring the elastic modulus (tensile elastic modulus) of the tension member (in longitudinal direction) shown in Table 2 will be described. A chuck was attached to a lower fixing portion and an upper load cell connecting portion of an Autograph ("AGS-J10kN" manufactured by Shimadzu Corporation) to fix the tension member. Next, the upper chuck was raised to apply a stress (about 10 N) to the extent that the tension member was not loosened. With the upper chuck position in this state as an initial position, the upper chuck was raised at a speed of 250 mm/min, the upper chuck was immediately lowered and returned to the initial position immediately after the stress of the tension member reached 200 N. In the stress-strain curve measured at this time, the slope (average inclination) of the straight line in the region (100 N to 200 N), which was in a relatively linear relationship, was calculated as the tensile elastic modulus of the tension member.

(RFL Liquid)

TABLE 3

|  | parts by mass |
|---|---|
| Resorcin | 1.35 |
| Formalin (solid content concentration: 37%) | 1 |
| Vinyl pyridine latex (solid content concentration: 40%) | 130 |
| Water | 50 |

One kind of tooth fabric was used for the helical toothed belt of Examples 1 to 18 and Comparative Examples 1 to 5. For the tooth fabric, a woven fabric of twill weave was used. The warp yarn of the woven fabric was disposed to extend in the belt width direction and the weft yarn thereof was disposed to extend in the belt longitudinal direction. As the weft yarn of the woven fabric, a multifilament yarn of 66 nylon having a fineness of 155 dtex and a multifilament yarn of spandex (polyurethane elastic fiber) having a fineness of 122 dtex were used. As the warp yarn of the woven fabric, a multifilament yarn of 66 nylon having a fineness of 155 dtex was used. Here, dtex (decitex) is the mass of 10,000 meters of the yarn in grams.

The woven fabric used as the tooth fabric was dipped in the RFL liquid shown in Table 3, and then heated and dried to perform an adhesive treatment to form an adhesive layer uniformly on the surface.

Unvulcanized rubber sheets respectively having compositions C1 to C3 shown in Table 4 below were prepared as unvulcanized rubber sheets to form the back portion and tooth portion of the helical toothed belt of Examples 1 to 18 and Comparative Examples 1 to 5.

(Composition of Unvulcanized Rubber Sheet)

TABLE 4

|  | C1 parts by mass | C2 parts by mass | C3 parts by mass |
| --- | --- | --- | --- |
| EPDM *1 | 100 | — | — |
| CR *2 | — | 100 | — |
| H-NBR *3 | — | — | 100 |
| Adipic acid plasticizer | 0.5 | 8.75 | — |
| Magnesium oxide | — | 4 | — |
| Oil | 8 | — | — |
| Stearic acid | — | — | 1 |
| Anti-aging agent *4 | 2 | 16.75 | — |
| Vulcanization accelerator *5 | 3.4 | 1.5 | 0.5 |
| Carbon black *6 | 50 | 45 | 50 |
| Inorganic filler | 5 | 35 | — |
| Zinc oxide *7 | 5 | 5 | 5 |
| Sulfur | 1 | 0.5 | 1.5 |
| Total | 174.9 | 216.5 | 158.0 |

*1 "EPT" manufactured by Mitsui Chemicals, Inc.
*2 "PM-40" manufactured by Denka
*3 "Zetpole 2021" manufactured by Zeon Corporation
*4 "Nocrack MB" manufactured by Ouchi Shinko Chemical Industrial Co., Ltd.
*5 "N-cyclohexyl-2 benzothiazole sulfenamide" manufactured by Ouchi Shinko Chemical Industrial Co., Ltd.
*6 "Seast 3" manufactured by Tokai Carbon Co., Ltd.
*7 "Zinc oxide, type III" manufactured by Seido Chemical Industry Co., Ltd.

The helical toothed belts of Examples 1 to 18 and Comparative Examples 1 to 5 were prepared by using the twisted cords (tension member) A1 to A4, the tooth fabric and the unvulcanized rubber sheets of the compositions C1 to C3, in accordance with the procedure described in the embodiment. Vulcanization was performed at 161° C. for 25 minutes. The configurations of the helical toothed belts of Examples 1 to 18 and Comparative Examples 1 to 5 are shown in the following Tables 5 to 10. The belt widths of the helical toothed belts of Examples 1 to 18 and Comparative Examples 1 to 5 were all 25 mm and the inclination angles of the tooth portions with respect to the belt width direction were all 5°. In Examples 1 to 18 and Comparative Examples 1 to 5, although the tooth height hb of the belt was varied, regarding the tooth groove depth of the pulley used in each test, as shown in Table 11, a pulley having a tooth groove depth corresponding to the respective tooth height hb was used.

In Table 5, in order to make a comparison in which the tooth pitch P was varied, the configurations of the helical toothed belts of Examples 1 to 4 and Comparative Examples 1 to 2 are described. In Table 6, in order to make a comparison in which the tooth height hb was varied based on the helical toothed belt of Example 2, the configurations of the helical toothed belts of Examples 2 and 5 to 8 are described. In Table 7, in order to make a comparison in which the belt back portion thickness tb was varied based on the helical toothed belt of Example 2, the configurations of the helical toothed belts of Examples 2, 9 to 11, and Comparative Example 3 are described. In Table 8, in order to make a comparison in which the rubber component was changed based on the helical toothed belt of Example 2, the configurations of the helical toothed belts of Examples 2 and 12 to 13 are described. In Table 9, in order to make a comparison in which the density of the tension member arrangement was varied based on the helical toothed belt of Example 2, the configurations of the helical toothed belts of Examples 2, 14 to 16, and Comparative Example 4 are described. In Table 10, in order to make a comparison in which the tension member material was varied based on the helical toothed belt of Example 2, the configurations of the helical toothed belts of Examples 17 to 18, and Comparative Example 5 are described.

TABLE 5

(Comparison in which tooth pitch P was varied)

|  |  | Example | | | | Comp. Ex. | |
| --- | --- | --- | --- | --- | --- | --- | --- |
|  |  | 1 | 2 | 3 | 4 | 1 | 2 |
| Tension member | Kind of fibers | | | A1 | | | |
|  | Tension member diameter D (mm) | | | 0.35 | | | |
|  | Tension member pitch SP (mm) | | | 0.56 | | | |
|  | Effective number of tension member (index) | | | 44 | | | |
| Tension member arrangement | Interval d between tension members adjacent to each other (mm) | | | 0.21 | | | |
|  | Ratio of total value of interval d to belt width (%) | | | 37.5% | | | |
| Rubber | Composition | | | C1 | | | |
| Belt | Perimeter (mm) | 342 | 343 | 344 | 342 | 343 | 340 |
|  | Tooth pitch P (mm) | 1.90 | 1.75 | 1.60 | 1.50 | 1.40 | 2.00 |
|  | Number of teeth | 180 | 196 | 215 | 228 | 245 | 170 |
|  | Tooth height hb (mm) | 0.84 | 0.77 | 0.70 | 0.66 | 0.62 | 0.88 |
|  | Ratio of tooth height to tooth pitch [hb/P × 100] | | | 44% | | | |

TABLE 5-continued (Comparison in which tooth pitch P was varied)

|  |  | Example | | | | Comp. Ex. | |
| --- | --- | --- | --- | --- | --- | --- | --- |
|  |  | 1 | 2 | 3 | 4 | 1 | 2 |
|  | Back portion thickness (mm) | 0.85 | | | | | |
|  | Total thickness (mm) | 1.69 | 1.62 | 1.55 | 1.51 | 1.47 | 1.73 |
|  | Belt width W (mm) | 25 | | | | | |
| Belt elastic modulus | Belt elastic modulus (N/%) | 800 | 800 | 800 | 800 | 800 | 800 |
|  | Belt elastic modulus (N/%)/1 mm width | 32.0 | 32.0 | 32.0 | 32.0 | 32.0 | 32.0 |
| Sound pressure test | Sound pressure (dBA) | 57 | 55 | 54 | 54 | 53 | 58 |
|  | Evaluation | B | A | A | A | A | C |
| Jumping test | Jumping torque (N · m) | 12.6 | 12.2 | 11.6 | 11.2 | 10.8 | 12.9 |
|  | Evaluation | A | A | A | A | C | A |
|  | Cold resistance test | A | A | A | A | A | A |
|  | Comprehensive Evaluation | B | A | A | A | C | C |

TABLE 6

(Comparison in which tooth height hb was varied based on helical toothed belt of Example 2)

|  |  | Example | | | | |
| --- | --- | --- | --- | --- | --- | --- |
|  |  | 5 | 6 | 2 | 7 | 8 |
| Tension member | Kind of fibers | A1 | | | | |
|  | Tension member diameter D (mm) | 0.35 | | | | |
|  | Tension member pitch SP (mm) | 0.56 | | | | |
|  | Effective number of tension member (index) | 44 | | | | |
| Tension member arrangement | Interval d between tension members adjacent to each other (mm) | 0.21 | | | | |
|  | Ratio of total value of interval d to belt width (%) | 37.5% | | | | |
| Rubber | Composition | C1 | | | | |
| Belt | Perimeter (mm) | 343 | 344 | 343 | 342 | 340 |
|  | Tooth pitch P (mm) | 1.75 | | | | |
|  | Number of teeth | 245 | 215 | 196 | 180 | 170 |
|  | Tooth height hb (mm) | 0.64 | 0.72 | 0.77 | 0.86 | 0.95 |
|  | Ratio of tooth height to tooth pitch [hb/P × 100] | 37% | 41% | 44% | 49% | 54% |
|  | Back portion thickness (mm) | 0.85 | | | | |
|  | Total thickness (mm) | 1.49 | 1.57 | 1.62 | 1.71 | 1.80 |
|  | Belt width W (mm) | 25 | | | | |
| Belt elastic modulus | Belt elastic modulus (N/%) | 800 | 800 | 800 | 800 | 800 |
|  | Belt elastic modulus (N/%)/1 mm width | 32.0 | 32.0 | 32.0 | 32.0 | 32.0 |
| Sound pressure test | Sound pressure (dBA) | 54 | 55 | 55 | 55 | 57 |
|  | Evaluation | A | A | A | A | B |
| Jumping test | Jumping torque (N · m) | 11.0 | 11.9 | 12.2 | 12.7 | 13.9 |
|  | Evaluation | B | A | A | A | A |
|  | Cold resistance test | A | A | A | A | A |
|  | Comprehensive Evaluation | B | A | A | A | B |

TABLE 7

(Comparison in which belt back portion thickness tb was varied based on helical toothed belt of Example 2)

|  |  | Example | | | | Comp. Ex. |
|---|---|---|---|---|---|---|
|  |  | 9 | 10 | 2 | 11 | 3 |
| Tension member | Kind of fibers | | | A1 | | |
|  | Tension member diameter D (mm) | | | 0.35 | | |
|  | Tension member pitch SP (mm) | | | 0.56 | | |
|  | Effective number of tension member (index) | | | 44 | | |
| Tension member arrangement | Interval d between tension members adjacent to each other (mm) | | | 0.21 | | |
|  | Ratio of total value of interval d to belt width (%) | | | 37.5% | | |
| Rubber Belt | Composition | | | C1 | | |
|  | Perimeter (mm) | | | 343 | | |
|  | Tooth pitch P (mm) | | | 1.75 | | |
|  | Number of teeth | | | 196 | | |
|  | Tooth height hb (mm) | | | 0.77 | | |
|  | Ratio of tooth height to tooth pitch [hb/P × 100] | | | 44% | | |
|  | Back portion thickness (mm) | 0.40 | 0.60 | 0.85 | 1.20 | 1.35 |
|  | Total thickness (mm) | 1.17 | 1.37 | 1.62 | 1.97 | 2.12 |
|  | Belt width W (mm) | | | 25 | | |
| Belt elastic modulus | Belt elastic modulus (N/%) | 800 | 800 | 800 | 800 | 800 |
|  | Belt elastic modulus (N/%)/1 mm width | 32.0 | 32.0 | 32.0 | 32.0 | 32.0 |
| Sound pressure test | Sound pressure (dBA) | 56 | 55 | 55 | 55 | 54 |
|  | Evaluation | B | A | A | A | A |
| Jumping test | Jumping torque (N · m) | 12.2 | 12.2 | 12.2 | 12.2 | 12.2 |
|  | Evaluation | A | A | A | A | A |
|  | Cold resistance test | A | A | A | B | C |
|  | Comprehensive Evaluation | B | A | A | B | C |

TABLE 8

(Comparison in which rubber component was changed based on helical toothed belt of Example 2)

|  |  | Example | | |
|---|---|---|---|---|
|  |  | 2 | 12 | 13 |
| Tension member | Kind of fibers | | A1 | |
|  | Tension member diameter D (mm) | | 0.35 | |
|  | Tension member pitch SP (mm) | | 0.56 | |
|  | Effective number of tension member (index) | | 44 | |
| Tension member arrangement | Interval d between tension members adjacent to each other (mm) | | 0.21 | |
|  | Ratio of total value of interval d to belt width (%) | | 37.5% | |
| Rubber Belt | Composition | C1 | C2 | C3 |
|  | Perimeter (mm) | | 343 | |
|  | Tooth pitch P (mm) | | 1.75 | |
|  | Number of teeth | | 196 | |
|  | Tooth height hb (mm) | | 0.77 | |
|  | Ratio of tooth height to tooth pitch [hb/P × 100] | | 44% | |
|  | Back portion thickness (mm) | | 0.85 | |
|  | Total thickness (mm) | | 1.62 | |
|  | Belt width W (mm) | | 25 | |
| Belt elastic modulus | Belt elastic modulus (N/%) | 800 | 800 | 800 |
|  | Belt elastic modulus (N/%)/1 mm width | 32.0 | 32.0 | 32.0 |
| Sound pressure test | Sound pressure (dBA) | 55 | 55 | 55 |
|  | Evaluation | A | A | A |
| Jumping test | Jumping torque (N · m) | 12.2 | 12.3 | 12.5 |
|  | Evaluation | A | A | A |
|  | Cold resistance test | A | B | B |
|  | Comprehensive Evaluation | A | B | B |

TABLE 9

(Comparison in which density of tension member arrangement
was varied based on helical toothed belt of Example 2)

|  |  | Example |  |  |  | Comp. Ex. |
| --- | --- | --- | --- | --- | --- | --- |
|  |  | 14 | 2 | 15 | 16 | 4 |
| Tension member | Kind of fibers |  |  | A1 |  |  |
|  | Tension member diameter D (mm) |  |  | 0.35 |  |  |
|  | Tension member pitch SP (mm) | 0.45 | 0.56 | 0.65 | 0.80 | 0.90 |
|  | Effective number of tension member (index) | 55 | 44 | 38 | 31 | 27 |
| Tension member arrangement | Interval d between tension members adjacent to each other (mm) | 0.10 | 0.21 | 0.30 | 0.45 | 0.55 |
|  | Ratio of total value of interval d to belt width (%) | 22.2% | 37.5% | 46.2% | 56.3% | 61.1% |
| Rubber | Composition |  |  | C1 |  |  |
| Belt | Perimeter (mm) |  |  | 343 |  |  |
|  | Tooth pitch P (mm) |  |  | 1.75 |  |  |
|  | Number of teeth |  |  | 196 |  |  |
|  | Tooth height hb (mm) |  |  | 0.77 |  |  |
|  | Ratio of tooth height to tooth pitch [hb/P × 100] |  |  | 44% |  |  |
|  | Back portion thickness (mm) |  |  | 0.85 |  |  |
|  | Total thickness (mm) |  |  | 1.62 |  |  |
|  | Belt width W (mm) |  |  | 25 |  |  |
| Belt elastic modulus | Belt elastic modulus (N/%) | 1000 | 800 | 691 | 560 | 488 |
|  | Belt elastic modulus (N/%)/1 mm width | 40.0 | 32.0 | 27.6 | 22.4 | 19.5 |
| Sound pressure test | Sound pressure (dBA) | 54 | 55 | 56 | 57 | 60 |
|  | Evaluation | A | A | B | B | C |
| Jumping test | Jumping torque (N · m) | 12.2 | 12.2 | 12.1 | 12.0 | 11.8 |
|  | Evaluation | A | A | A | A | A |
|  | Cold resistance test | A | A | A | A | A |
|  | Comprehensive Evaluation | A | A | B | B | C |

TABLE 10

(Comparison in which tension member material was varied
based on helical toothed belt of Example 2)

|  |  | Example |  |  | Comparative Example |
| --- | --- | --- | --- | --- | --- |
|  |  | 2 | 17 | 18 | 5 |
| Tension member | Kind of fibers | A1 | A2 | A4 | A3 |
|  | Tension member diameter D (mm) | 0.35 | 0.35 | 0.53 | 0.35 |
|  | Tension member pitch SP (mm) | 0.56 | 0.56 | 0.98 | 0.56 |
|  | Effective number of tension member (index) | 44 | 44 | 25 | 44 |
| Tension member arrangement | Interval d between tension members adjacent to each other (mm) | 0.21 | 0.21 | 0.45 | 0.21 |
|  | Ratio of total value of interval d to belt width (%) | 37.5% | 37.5% | 45.9% | 37.5% |
| Rubber | Composition |  | C1 |  |  |
| Belt | Perimeter (mm) |  | 343 |  |  |
|  | Tooth pitch P (mm) |  | 1.75 |  |  |

TABLE 10-continued (Comparison in which tension member material was varied
based on helical toothed belt of Example 2)

|  |  | Example | | | Comparative Example |
|---|---|---|---|---|---|
|  |  | 2 | 17 | 18 | 5 |
|  | Number of teeth | | 196 | | |
|  | Tooth height hb (mm) | | 0.77 | | |
|  | Ratio of tooth height to tooth pitch [hb/P × 100] | | 44% | | |
|  | Back portion thickness (mm) | | 0.85 | | |
|  | Total thickness (mm) | | 1.62 | | |
|  | Belt width W (mm) | | 25 | | |
| Belt elastic modulus | Belt elastic modulus (N/%) | 800 | 823 | 3040 | 743 |
|  | Belt elastic modulus (N/%)/1 mm width | 32.0 | 32.9 | 121.6 | 29.7 |
| Sound pressure test | Sound pressure (dBA) | 55 | 55 | 53 | 63 |
|  | Evaluation | A | A | A | C |
| Jumping test | Jumping torque (N · m) | 12.2 | 12.6 | 12.3 | 10.8 |
|  | Evaluation | A | A | A | C |
|  | Cold resistance test | A | A | A | A |
|  | Comprehensive Evaluation | A | A | A | C |

TABLE 11

| Tooth pitch P (mm) | 1.4 | 1.5 | 1.6 | | | 1.75 | | | 1.9 | 2.0 |
|---|---|---|---|---|---|---|---|---|---|---|
| Tooth height hb of belt (mm) | 0.62 | 0.66 | 0.7 | 0.53 | 0.72 | 0.77 | 0.86 | 1.05 | 0.84 | 0.88 |
| Tooth groove depth of pulley (mm) | 0.62 | 0.66 | 0.7 | 0.53 | 0.72 | 0.77 | 0.86 | 1.05 | 0.84 | 0.88 |

(Measurement of Belt Elastic Modulus)

The belt elastic modulus (tensile elastic modulus) was measured with respect to the helical toothed belts (in belt longitudinal direction) of Examples 1 to 18 and Comparative Examples 1 to 5. A method of measuring the belt elastic modulus will be described. A pair of pulleys (30 teeth, outer diameter: 18.6 mm) were attached to the lower fixing portion and the upper load cell connecting portion of the Autograph ("AGS-J10kN" manufactured by Shimadzu Corporation), and the helical toothed belt was hung on the pulleys. Next, the upper pulley was raised to apply a tension (about 10 N) to the extent that the helical toothed belt was not loosened. With the upper pulley position in this state as an initial position, the upper pulley was raised at a speed of 50 mm/min, the upper pulley was immediately lowered and returned to the initial position immediately after the tension of the helical toothed belt reached 500 N. In a stress-strain curve (S-S line diagram) showing a relationship between the belt tension (N) and the belt elongation ratio (%) measured at this time, a value (N/%) of the belt tension (N) with respect to the belt elongation ratio (%) was calculated from the slope (average inclination) of the straight line of the region (100 N to 500 N), which was in a relatively linear relationship, and the value was taken as a belt elastic modulus (tensile elastic modulus). The value was converted into the belt elastic modulus per 1 mm of the belt width, and the case where the belt elastic modulus per 1 mm of the belt width was 22 N/% or more was evaluated that the rigidity of the helical toothed belt was high.

(Sound Pressure Measurement Test)

A sound pressure measurement test was performed on the helical toothed belts of Examples 1 to 18 and Comparative Examples 1 to 5 to evaluate the noise during running of the belt. A two-axis running tester was used for the test. Like the deceleration device 20 illustrated in FIG. 2, the two-axis running tester has a configuration including a driving pulley 21 and a driven pulley 22 having a diameter larger than that of the driving pulley 21. Pulleys with the number of teeth shown in Table 12 were used for the driving pulley 21 and the driven pulley 22. The helical toothed belt was wound around the driving pulley 21 and the driven pulley 22, the distance between the shafts of the pulleys was adjusted so that the belt tension was 90 N, the driven pulley was loaded with a load of 5 Nm, and the driving pulley was rotated at a rotation speed of 1,200 rpm to run the helical toothed belt. The ambient temperature was 23° C. Then, the sound pressure (noise level) was measured by a sound collecting microphone M of a sound level meter. Just in order to explain the position of the sound collecting microphone M, the sound collecting microphone M is displayed with the deceleration device 20 illustrated in FIG. 2. Specifically, the sound collecting microphone M was disposed at a position 30 mm away from a position B in the vertically outer direction with respect to the outer peripheral surface of the helical toothed belt 30, where the position B is defined such that when a straight line A passing through the center position S of the driving pulley 21 and perpendicular to a straight line T passing through the center position S of the driving pulley 21 and the center position K of the driven pulley 22 is moved in parallel toward the driven pulley 22 by 25 mm, the point where the moved straight line A and the outer peripheral surface of the helical toothed belt 30 are in contact is defined as the position B. The measurement results measured by the sound collecting microphone M are shown in Tables 5 to 10. In the measurement results of Tables 5 to 10, values of the sound pressure are expressed as integer values rounded off to one decimal place. From the results, ranking was performed by using ranks A, B, and C according to the numerical values of the sound pressure, and the case where the sound pressure (integer value rounded off to one decimal place) was 55 dBA or less was evaluated as rank A, the case of 56 dBA to 57 dBA was evaluated as rank B, and the case of 58 dBA or more was evaluated as rank C. From the viewpoint of suitability as a practical noise level of the helical toothed belt, a belt having rank A or B is preferable, and a belt having a rank A is particularly preferably used.

TABLE 12

| Tooth pitch P (mm) | 1.4 | 1.5 | 1.6 | 1.75 | 1.9 | 2.0 |
|---|---|---|---|---|---|---|
| Number of teeth of driving pulley | 57 | 53 | 50 | 46 | 42 | 40 |
| Number of teeth of driven pulley | 153 | 143 | 134 | 123 | 113 | 107 |

(Jumping Test)

A Jumping test was performed on the helical toothed belts of Examples 1 to 18 and Comparative Examples 1 to 5. A two-axis torque measurement tester was used for the test. In the layout used in the above-described sound pressure measurement test, a helical toothed belt was wound between the driving pulley and the driven pulley, and the distance between the shafts of the pulleys was adjusted so that the belt tension was 50N. Then, as illustrated in FIG. 6, after fixing the driven pulley in advance so as not to rotate, a hexagon wrench inserted into the shaft of the driving pulley was manually turned in the direction of the arrow in FIG. 6 to rotate the driving pulley, and the load torque applied to the driving shaft when tooth skipping (jumping) occurred was measured as the jumping torque. The measurement results are shown in Tables 5 to 10. As an evaluation of jumping performance (difficulty in tooth skipping), using the jumping torque value as an index (the larger the torque value, the more difficult the tooth skipping), the case where the jumping torque value is 11.2 N·m or more was evaluated as rank A; the case of 11.0 N·m or more and less than 11.2 N·m was evaluated as rank B; and is the case of less than 11.0 N·m was evaluated as rank C. From the viewpoint of suitability for actual use in this application, the belts of rank A and rank B were regarded as acceptable levels.

(Cold Resistance Test)

A cold resistance (low-temperature durability) test was performed by using a two-axis running tester having the same layout as the sound pressure measurement test. The atmosphere temperature was −40° C., and the driving pulley 21 was rotated at a rotational speed of 2,000 rpm with no load. A cycle of rotating the driving pulley for 6 seconds and then stopping for 10 minutes was repeated 1,000 cycles. Then, in the 500th cycle and the 1,000th cycle, whether or not a crack occurred in the surface of the back portion of the helical toothed belt was visually checked.

The check results are shown in Tables 5 to 10 using ranks A, B, and C. The rank A is the case in which a crack did not occur even in the 1,000th cycle. The rank B is the case in which no crack occurred in the 500th cycle and a crack occurred in the 1,000th cycle. The rank C is the case in which a crack occurred in the 500th cycle. As an index of the cold resistance (low-temperature durability), when the belt is used in a cold region in which the minimum temperature reaches −40° C., compared to belts having the rank A, the grades are ranked in order of ranks B and C, which are likely to reach the crack life and inferior in low-temperature durability. From the viewpoint of suitability for actual use in such a cold region where the minimum temperature reaches −40° C., a belt having rank A or B is preferable, and a belt having a rank A is particularly preferably used.

(Test Results)

With respect to the helical toothed belts of Examples 1 to 18 and Comparative Examples 1 to 5, from the measured values of the belt elastic modulus and the results of each ranking in the sound pressure test, the jumping test and the cold resistance test, comprehensive evaluation was made based on the following criteria.

Rank A: Rank A for all test items
Rank B: There are no test items for the rank C, but there is at least one test item for the rank B
Rank C: There is at least one test item for the rank C (Test Results: Comparison in Varying Tooth Pitch P)

The helical toothed belts of Examples 1 to 4 and Comparative Examples 1 to 2 shown in Table 5 were helical toothed belts having the same configuration except that the tooth pitch P was varied. Regarding the helical toothed belts of Examples 1 to 4, the sound pressure was lower (rank A or rank B) than the conventional helical toothed belt (Comparative Example 2) having a tooth pitch (2.0 mm), the jumping performance and the cold resistance were acceptable levels (rank A), and the comprehensive evaluation was Rank A or Rank B.

On the other hand, in Comparative Example 1 in which the tooth pitch P was further reduced (1.40 mm) than that in Examples 1 to 4, although the sound pressure was reduced, the case was unacceptable (rank C) as the jumping performance.

(Comparison in Varying Tooth Height hb)

The helical toothed belts of Examples 5 to 8 shown in Table 6 are examples in which the tooth height hb was varied while the tooth pitch was 1.75 mm based on the helical toothed belt of Example 2 (tooth pitch 1.75 mm). In Example 6 (41%), Example 2 (44%), and Example 7 (49%) in which the tooth height hb was in the range of 40% to 50% with respect to the tooth pitch P, the sound pressure was reduced (rank A), the jumping performance and the cold resistance were acceptable levels (rank A), and the comprehensive evaluation was Rank A. In Example 5 in which the tooth height hb was 37% with respect to the tooth pitch P, the jumping performance was slightly poor (rank B), and in Example 8 in which the tooth height hb was 54% with respect to the tooth pitch P, the sound pressure was slightly high (rank B), so that the comprehensive evaluation was Rank B.

(Comparison in Varying Thickness tb of Belt Back Portion)

The helical toothed belts of Examples 9 to 11 and Comparative Example 3 shown in Table 7 are examples in which the thickness tb of the back portion was varied based on the helical toothed belt (the back portion thickness of 0.85 mm) of Example 2. In Example 9 (0.4 mm), Example 10 (0.6 mm), and Example 11 (1.2 mm) in which the thickness tb of the belt back portion was in the range of 0.4 mm to 1.2 mm, the sound pressure was reduced (rank A or B), the jumping performance and the cold resistance were acceptable levels (rank A or B), and the comprehensive evaluation was Rank A or Rank B. On the other hand, in Comparative Example 3 in which the thickness of the back portion was as large as 1.35 mm, since the cold resistance (low-temperature durability) was unacceptable (rank C) due to the decrease in the bendability of the belt, the comprehensive evaluation was Rank C.

Here, the reduction in the cold resistance means that defects such as cracks are likely to occur when used (bending running) in a low-temperature environment. In the case where a helical toothed belt is used for vehicle applications, the cold resistance for use in a cold region (e.g., −40° C.) is also important. According to Examples 2, 9 to 11, and Comparative Example 3, in the helical toothed belt having a smaller thickness tb of the back portion, as the rigidity of the belt reduces (improve in bendability), the vibration (sound pressure) is increased and the silence is decreased, while the cold resistance is improved. On the other hand, in the helical toothed belt having a larger thickness tb of the back portion, the vibration (sound pressure) is reduced and the silence is improved, while the cold resistance of the belt decreases due to an increase in the rigidity (decrease in bendability) of the belt. Therefore, the upper and lower limits of the thickness tb of the back portion are important, and according to Examples 2, 9 to 11 and Comparative Example 3, in the case where the tooth pitch P is 1.75 mm, the thickness tb of the back portion is preferably 0.4 mm to 1.2 mm, and particularly preferably 0.6 mm to 0.9 mm.

(Comparison in Changing Rubber Components)

The helical toothed belts of Examples 12 to 13 shown in Table 8 are examples in which the rubber component was changed based on the helical toothed belt of Example 2 (EPDM). In Example 12 where the rubber component was CR and Example 13 where the rubber component was H-NBR, the effect of reducing the sound pressure (rank A) was observed as in Example 2 (EPDM), and the jumping performance was also on the same level. However, due to the natures of CR and H-NBR, the cold resistance was slightly inferior (rank B) in Examples 12 and 13, the comprehensive evaluation was Rank B.

(Comparison in Varying Density of Tension Member Arrangement)

The helical toothed belts of Examples 14 to 16 and Comparative Example 4 shown in Table 9 are examples in which the ratio is varied by changing the tension member pitch SP based on the helical toothed belt of Example 2 (ratio of the total value of the interval d to the belt width W: 37.5%). In Example 14 (22.2%), Example 15 (46.2%), and Example 16 (56.3%) in which the ratio of the total value of the interval d to the belt width W was in a range of 20% or more and 60% or less, the sound pressure was reduced (rank A or B), the jumping performance and the cold resistance were acceptable levels (rank A or B), and the comprehensive evaluation was Rank A or Rank B. On the other hand, in Comparative Example 4 in which the ratio of the total value of the interval d to the belt width W was as large as 61.1%, since the density of the tension member arrangement was low, the belt elastic modulus that could suppress vibration was not obtained (less than 22 N/% per 1 mm belt width), and the sound pressure was not reduced (rank C), so that the comprehensive evaluation was Rank C.

From the above-described results, the ratio of the total value of the interval d to the belt width W is preferably in the range of 20% or more and 60% or less, and particularly preferably in the range of 20% or more and 40% or less. The belt elastic modulus per 1 mm of the belt width is preferably 22 N/% or more, and particularly preferably 30 N/% or more.

(Comparison in Changing Tension Member Materials)

The helical toothed belts of Examples 17 to 18 and Comparative Example 5 shown in Table 10 are examples in which the fiber material forming the tension member was changed based on the helical toothed belt of Example 2 (K glass fiber: A1). Example 17 using a tension member of high-strength glass fiber (U glass fiber: A2) different from that of Example 2 and Example 18 using a tension member of carbon fiber (A4) had performances on the same level as Example 2. On the other hand, in Comparative Example 5 that is an example using a tension member of glass fiber (E glass fiber: A3) that is not high-strength glass fiber, vibration was not suppressed and sound pressure was not reduced (rank C). Furthermore, the jumping performance was also unacceptable (rank C).

This application is based on Japanese patent application No. 2018-073961 filed on Apr. 6, 2018, and Japanese patent application No. 2019-057682 filed on Mar. 26, 2019, the contents of which are incorporated herein by reference.

REFERENCE SIGNS LIST

1 Electric power steering apparatus
15 Electric motor (Driving source)
20 Deceleration device (belt power transmission device)
21 Driving pulley
22 Driven pulley
30 Helical toothed belt
31 Back portion
32 Tooth portion
33 Tension member
35 Tooth fabric
P Tooth pitch
SP Tension member pitch
hW Length of tooth portion in belt longitudinal direction
t Total thickness of helical toothed belt
tb Thickness of back portion
hb Tooth height of tooth portion

The invention claimed is:

1. A helical toothed belt, comprising:
a back portion;
a plurality of tension members buried in the back portion and arranged in a belt width direction; and
a plurality of tooth portions that are arranged at a predetermined interval along a belt longitudinal direction on one surface of the back portion and each are inclined with respect to the belt width direction,
wherein a surface of the tooth portion and a portion of the one surface of the back portion are formed of a tooth fabric,
wherein the plurality of tooth portions have a tooth pitch of 1.5 mm or more and less than 2.0 mm, while the back portion has a thickness of 0.4 mm or more and 1.2 mm or less,
the tension members are formed of a twisted cord containing a high-strength glass fiber or a carbon fiber, and
wherein a ratio of a total value of an interval between the tension members adjacent to each other in a belt width direction to the belt width is in a range of 20% or more and 40% or less.

2. The helical toothed belt according to claim 1, wherein each of the plurality of tension members has a diameter in a range of 0.2 mm or more and 0.6 mm or less.

3. The helical toothed belt according to claim 1, wherein the tension members are arranged such that each tension member pitch between the adjacent tension members is in a range of 0.45 mm or more and 1.0 mm or less.

4. The helical toothed belt according to claim 3, wherein the tension members buried in the back portion are arranged such that the tension member pitch is a constant value in a range of 0.45 mm or more and 1.0 mm or less from one end to the other end of the helical toothed belt in the belt width direction.

5. The helical toothed belt according to claim 1, wherein the tooth portion has a tooth height in a range of 0.6 mm or more and 1.0 mm or less, and has a height in a range of 40% to 50% relative to the tooth pitch.

6. The helical toothed belt according to claim 1, wherein the back portion comprises a rubber component, and the rubber component comprises at least an ethylene-propylene-diene terpolymer or hydrogenated nitrile rubber.

7. The helical toothed belt according to claim 1, wherein the tooth fabric is formed of a woven fabric comprising warp yarns and weft yarns, and the warp yarns or the weft yarns are disposed so as to extend in the belt longitudinal direction, and the warp yarns or the weft yarns disposed so as to extend in the belt longitudinal direction comprises an elastic yarn having stretchability.

8. The helical toothed belt according to claim 1, wherein the tooth fabric is formed of fibers comprising at least one kind of fibers selected from the group consisting of nylon, aramid, polyester, polybenzoxazole, and cotton.

9. The helical toothed belt according to claim 1, wherein another surface of the back portion is formed of a back fabric, and
the back fabric is formed of fibers comprising at least one kind of fibers selected from the group consisting of nylon, aramid and polyester.

10. The helical toothed belt according to claim 1, having a belt elastic modulus of 22 N/% or more, the belt elastic modulus defined by a belt tension (N) per 1 mm of the belt width with respect to a belt elongation rate (%) when the helical toothed belt is wound around pulleys with a predetermined mounting tension.

11. A belt power transmission device, comprising:
a driving pulley rotationally driven by a driving source;
a driven pulley; and
the helical toothed belt as described in claim 1, wound around the driving pulley and the driven pulley.

12. The belt power transmission device according to claim 11, wherein the driving pulley has a rotational speed of 1,000 rpm or more and 4,000 rpm or less.

13. The belt power transmission device according to claim 11, wherein the driven pulley is applied a load of 0.5 kW or more and 3 kW or less.

14. The belt power transmission device according to claim 11,
wherein the driven pulley has an outer diameter larger than an outer diameter of the driving pulley, and
the belt power transmission device is a deceleration device of an electric power steering apparatus for vehicles.

* * * * *